(12) United States Patent
Chatterjee et al.

(10) Patent No.: US 8,458,612 B2
(45) Date of Patent: Jun. 4, 2013

(54) APPLICATION MANAGEMENT FRAMEWORK FOR WEB APPLICATIONS

(75) Inventors: Manjirnath Chatterjee, San Francisco, CA (US); Gregory R. Simon, San Francisco, CA (US); Roderick Swift, Walnut Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 12/181,776

(22) Filed: Jul. 29, 2008

(65) Prior Publication Data
US 2009/0055749 A1    Feb. 26, 2009

Related U.S. Application Data

(60) Provisional application No. 60/952,588, filed on Jul. 29, 2007, provisional application No. 60/954,022, filed on Aug. 6, 2007.

(51) Int. Cl.
*G06F 3/048* (2006.01)

(52) U.S. Cl.
USPC ............ 715/779; 715/738; 715/764; 715/767

(58) Field of Classification Search
USPC ......... 715/738, 749, 760, 764–767, 778–779, 715/782–783, 802, 846, 864
See application file for complete search history.

(56) References Cited

U.S. PATENT DOCUMENTS

| | | | |
|---|---|---|---|
| 5,020,090 A | 5/1991 | Morris | |
| 5,105,184 A | 4/1992 | Pirani et al. | |
| 5,297,142 A | 3/1994 | Paggeot et al. | |
| 5,403,639 A | 4/1995 | Belsan et al. | |
| 5,625,673 A | 4/1997 | Grewe et al. | |
| 5,664,228 A | 9/1997 | Mital | |
| 5,724,655 A | 3/1998 | Grube et al. | |
| 5,727,159 A | 3/1998 | Kikinis | |
| 5,745,115 A * | 4/1998 | Purple et al. ................... 715/810 |
| 5,797,089 A | 8/1998 | Nguyen | |

(Continued)

FOREIGN PATENT DOCUMENTS

| EP | 1215575 A2 | 6/2002 |
|---|---|---|
| EP | 1330098 A1 | 7/2003 |

(Continued)

OTHER PUBLICATIONS

Non-Final Office Action Mailed Jun. 11, 2010, U.S. Appl. No. 11/1873,305, 21 pages.

(Continued)

*Primary Examiner* — Weilun Lo
*Assistant Examiner* — Enrique Iturralde

(57) ABSTRACT

Various embodiments are directed to an application management framework for web applications that may provide speed improvements, capability improvements, user experience improvements, increased advertising profit opportunities, and simplified application development to wide range of network devices. The described embodiments may employ techniques for containing, controlling, and presenting multiple web-based applications in a shared web browser application management framework. Sharing a web browser application management framework provides the capability for rapidly switching between applications, allows for multitasking, facilitates using a common set of input controls for applications, and makes it possible for applications to be available with little perceived startup ("boot") time. The described embodiments also provide incentives for web application users, web application developers, web application portal providers, and web advertising providers to share in transactions between one another.

15 Claims, 9 Drawing Sheets

U.S. PATENT DOCUMENTS

| | | | | |
|---|---|---|---|---|
| 5,870,680 | A | 2/1999 | Guerlin et al. | |
| 5,873,045 | A | 2/1999 | Lee et al. | |
| 5,983,073 | A | 11/1999 | Ditzik | |
| 6,034,321 | A | 3/2000 | Jenkins | |
| 6,157,982 | A | 12/2000 | Deo et al. | |
| 6,201,540 | B1* | 3/2001 | Gallup et al. | 715/764 |
| 6,311,209 | B1 | 10/2001 | Olson et al. | |
| 6,341,314 | B1* | 1/2002 | Doganata et al. | 709/229 |
| 6,401,113 | B2 | 6/2002 | Lazaridis et al. | |
| 6,546,262 | B1 | 4/2003 | Freadman | |
| 6,577,877 | B1 | 6/2003 | Charlier et al. | |
| 6,625,472 | B1 | 9/2003 | Farazmandnia et al. | |
| 6,633,759 | B1 | 10/2003 | Kobayashi | |
| 6,640,249 | B1* | 10/2003 | Bowman-Amuah | 709/228 |
| 6,779,019 | B1 | 8/2004 | Mousseau et al. | |
| 6,883,143 | B2* | 4/2005 | Driskell | 715/763 |
| 6,895,220 | B2 | 5/2005 | Usui | |
| 6,947,975 | B2 | 9/2005 | Wong et al. | |
| 6,957,085 | B2 | 10/2005 | Shin et al. | |
| 6,978,472 | B1* | 12/2005 | Nashida et al. | 725/52 |
| 6,999,792 | B2 | 2/2006 | Warren | |
| 7,013,112 | B2 | 3/2006 | Haller et al. | |
| 7,047,038 | B1 | 5/2006 | Macor | |
| 7,054,594 | B2 | 5/2006 | Bloch et al. | |
| 7,155,490 | B1* | 12/2006 | Malmer et al. | 709/217 |
| 7,383,061 | B1 | 6/2008 | Hawkins | |
| 7,890,889 | B2* | 2/2011 | Artman et al. | 715/821 |
| 8,137,200 | B2* | 3/2012 | Kelly et al. | 463/42 |
| 2001/0037490 | A1* | 11/2001 | Chiang | 717/2 |
| 2002/0151283 | A1 | 10/2002 | Pallakoff | |
| 2003/0018714 | A1* | 1/2003 | Mikhailov et al. | 709/203 |
| 2003/0140120 | A1* | 7/2003 | Hartman | 709/219 |
| 2004/0104929 | A1* | 6/2004 | Chen et al. | 345/738 |
| 2004/0122774 | A1 | 6/2004 | Studd et al. | |
| 2004/0153973 | A1* | 8/2004 | Horwitz | 715/530 |
| 2005/0008003 | A1* | 1/2005 | Ramey et al. | 370/352 |
| 2005/0027818 | A1 | 2/2005 | Friedman et al. | |
| 2005/0038900 | A1 | 2/2005 | Krassner et al. | |
| 2005/0235209 | A1* | 10/2005 | Morita et al. | 715/716 |
| 2006/0069998 | A1* | 3/2006 | Artman et al. | 715/721 |
| 2006/0168101 | A1 | 7/2006 | Mikhailov et al. | |
| 2006/0184613 | A1 | 8/2006 | Stienessen et al. | |
| 2006/0242278 | A1 | 10/2006 | Hawkins | |
| 2007/0101291 | A1* | 5/2007 | Forstall et al. | 715/805 |
| 2007/0101297 | A1* | 5/2007 | Forstall et al. | 715/841 |
| 2007/0160345 | A1* | 7/2007 | Sakai et al. | 386/95 |
| 2007/0198698 | A1 | 8/2007 | Boyd et al. | |
| 2007/0239884 | A1 | 10/2007 | Karmakar et al. | |
| 2008/0015878 | A1* | 1/2008 | Feng et al. | 705/1 |
| 2008/0034031 | A1 | 2/2008 | Weisbrot et al. | |
| 2008/0059893 | A1* | 3/2008 | Byrne et al. | 715/757 |
| 2008/0066078 | A1* | 3/2008 | Rathod et al. | 719/311 |
| 2008/0098093 | A1 | 4/2008 | Simon et al. | |
| 2008/0122796 | A1* | 5/2008 | Jobs et al. | 345/173 |
| 2008/0147671 | A1 | 6/2008 | Simon et al. | |
| 2008/0248813 | A1 | 10/2008 | Chatterjee | |
| 2008/0248834 | A1 | 10/2008 | Chatterjee et al. | |
| 2008/0281798 | A1 | 11/2008 | Chatterjee et al. | |
| 2008/0295017 | A1* | 11/2008 | Tseng et al. | 715/777 |
| 2009/0055749 | A1 | 2/2009 | Chatterjee et al. | |
| 2009/0315867 | A1* | 12/2009 | Sakamoto et al. | 345/184 |
| 2011/0242361 | A1* | 10/2011 | Kuwahara et al. | 348/231.4 |

FOREIGN PATENT DOCUMENTS

| | | | |
|---|---|---|---|
| JP | 2002-259009 | * | 9/2002 |
| WO | 9926159 | A2 | 5/1999 |
| WO | 2009018277 | A1 | 2/2009 |

OTHER PUBLICATIONS

PCT International Search Report and Written Opinion, Application No. PCT/US2006/014060, Published Sep. 1, 2006, 12 pages.

Dasgupta, S., et al, "A Movable User Interface Based on a Simple X-Window Like Protocol", Gas Authority of India Ltd., (3), Aug. 1991, pp. 199-203.

* cited by examiner

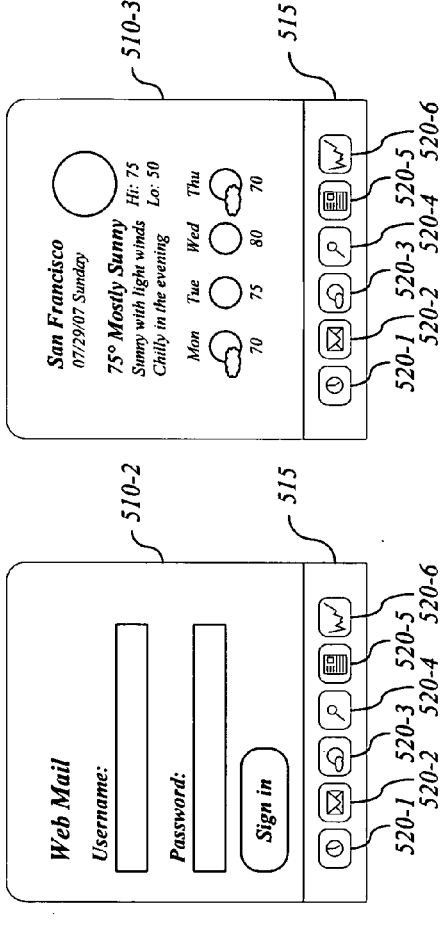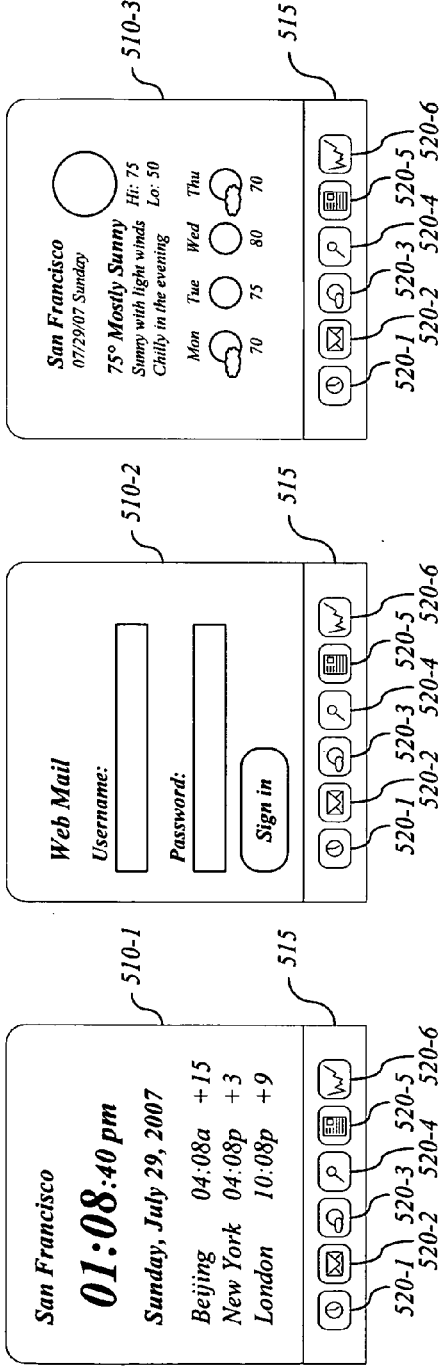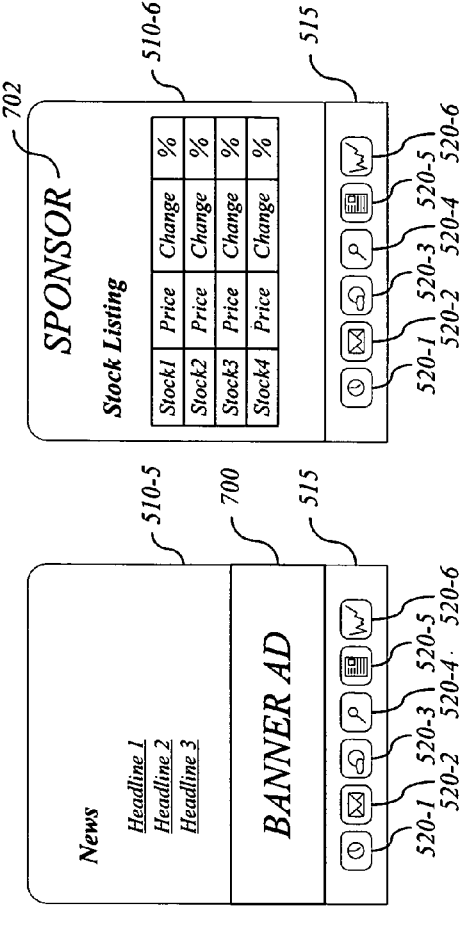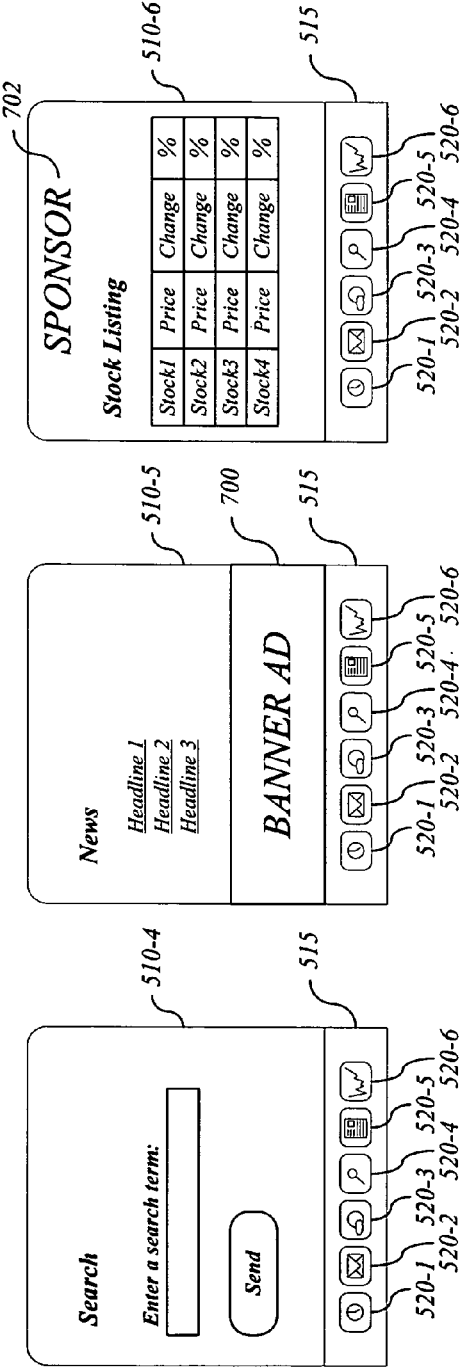

APPLICATION MANAGEMENT FRAMEWORK FOR WEB APPLICATIONS

RELATED APPLICATIONS

This application claims priority to U.S. Provisional Patent Application Ser. No. 60/952,588, which was filed on Jul. 29, 2007 and U.S. Provisional Patent Application Ser. No. 60/954,022, which was filed on Aug. 6, 2007. This application is also related and claims priority to U.S. patent application Ser. No. 11/382,058 titled "Method for Synchronizing Software Application and User Data for Asynchronous Client-Server and Peer to Peer Computer Networks," which was filed on May 8, 2006; U.S. patent application Ser. No. 11/612,282 titled "System for Running Web Applications Offline and Providing Access to Native Services," which was filed on Dec. 18, 2006; U.S. patent application Ser. No. 11/873,305 titled "Offline Automated Proxy Cache for Web Applications," which was filed on Oct. 16, 2007; U.S. patent application Ser. No. 12/019,362 titled "System and Methods for Providing Granular Security for Locally Running Scripted Environments and Web Applications," which was filed on Jan. 4, 2008; U.S. patent application Ser. No. 12/061,179 titled "System and Methods for Providing Access to a Desktop and Applications of a Mobile Device," which was filed on Apr. 2, 2008; and U.S. patent application Ser. No. 12/116,697 titled "Automatic Conversion Schema for Cached Web Requests," which was filed on May 7, 2008. These applications are entirely incorporated by reference.

BACKGROUND

Web browsers have become highly capable software packages in recent years. In addition to rendering web pages, a web browser may run small applications, sometimes referred to as "widgets." Many web browsers also support the ability to run more complex web applications in the web browser. Such web applications may be implemented using various web technologies such as HTML, XHTML, XML, and Asynchronous JavaScript and XML(Ajax).

Although a web application has many advantages, it suffers in a number of areas. For instance, because the web application depends on the web browser, the web browser must start before the web application can run. This delay may be unappealing to the end user, especially if the device running the web application has limited processing capability, as is the case for many mobile devices. In addition, if the web browser is not running, the web application is not running either. Therefore, the web application is unable to update its data. Furthermore, if the user wishes to run several web applications at the same time, the user must explicitly start each application. Also, there is no simple way for multiple web applications to have a shared set of user input controls.

Some widgets may run in a web browser on a mobile device, such as a cellular telephone. These widgets have some benefits of web applications such as being relatively easy for a developer to write using web technologies, but suffer in other areas. First, a user cannot click on a hyperlink in a widget to download a web page. Second, when a user wishes to switch from one widget to another, the user exits the underlying browser running the first widget and then starts a new browser instance to run the second widget. Since the two widgets are not running simultaneously, the process of switching from one widget to another takes a significant amount of time, which is undesirable for the end user. Additionally, there is no mechanism for managing multiple widgets from a common user interface.

Web-based advertising has become common practice, whereby advertisements are inserted into web pages based on a variety of criteria. If the web browser is not connected to the Internet, however, the advertisement cannot be inserted into the web page. For a mobile device, such as a cellular telephone, it is common for the device to be disconnected from the network when receiving a when weak signal or when out of a coverage area. Furthermore, the advertisement hosting provider cannot collect advertising revenue for ads that are clicked when the device is offline, even though the end user has viewed and/or clicked the ad. In such cases, an advertiser may get the benefit of the advertising without paying the provider for use of the communication medium. Moreover, current widgets do not readily support web-based advertising.

BRIEF DESCRIPTION OF THE DRAWINGS

FIGS. 7A-7F illustrate embodiments of web application and application management framework user interfaces.

DETAILED DESCRIPTION

Various embodiments are directed to an application management framework for web applications that may provide speed improvements, capability improvements, user experience improvements, increased advertising profit opportunities, and simplified application development to wide range of network devices. The described embodiments may employ techniques for containing, controlling, and presenting multiple web-based applications in a shared web browser application management framework. Such techniques are particularly well-suited to mobile devices, such as cellular phones, that have limited processing capabilities, intermittent access to a network, small display screens, and limited user input capabilities.

Sharing a web browser application management framework provides the capability for rapidly switching between applications, allows for multitasking, facilitates using a common set of input controls for applications, and makes it possible for applications to be available with little perceived startup ("boot") time.

Furthermore, applications within the shared web browser application management framework may have access to the additional capabilities provided by the framework, such as caching of content or data for offline access, providing for updates to the contained applications, accessing native services of the mobile device such as calendar or contact data, and insertion of advertising into the application user interfaces. The described embodiments also provide incentives for web application users, web application developers, web application portal providers, and web advertising providers to share in transactions between one another.

Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
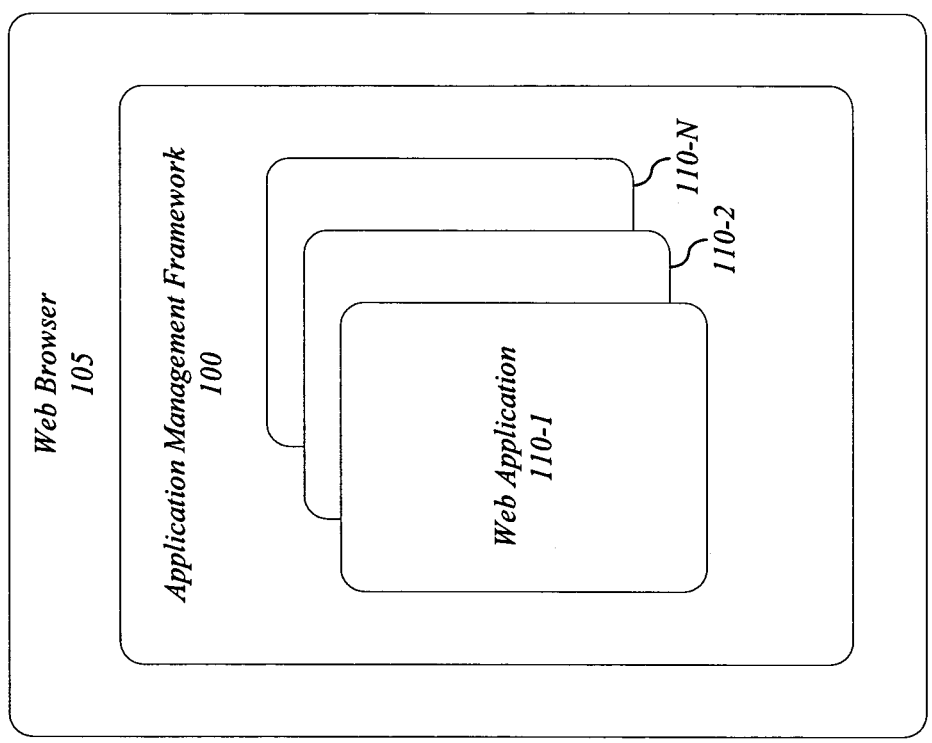
FIG. 1 illustrates an embodiment of an application management framework.

FIG. 1 illustrates an architectural view of an application management framework 100 suitable for implementing various embodiments. Although FIG. 1 may show a limited number of components by way of example, it can be appreciated that a greater or a fewer number of components may be employed for a given implementation.

In various embodiments, the application management framework 100 may be implemented by a computing device. Elements of the computing device may comprise various physical and/or logical components for communicating information which may be implemented as hardware components (e.g., computing devices, processors, logic devices), executable computer program instructions (e.g., firmware, software) to be executed by various hardware components, or any combination thereof, as desired for a given set of design parameters or performance constraints. Exemplary computing devices may include a personal computer (PC), desktop PC, notebook PC, laptop computer, mobile computing device, smart phone, personal digital assistant (PDA), mobile telephone, combination mobile telephone/PDA, video device, television (TV) device, digital TV (DTV) device, high-definition TV (HDTV) device, media player device, gaming device, messaging device, or any other suitable communications device in accordance with the described embodiments.

The computing device comprising the application management framework 100 may form part of a wired communications system, a wireless communications system, or a combination of both. For example, the computing device may be arranged to communicate information over one or more types of wired communication links such as a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The computing device may be arranged to communicate information over one or more types of wireless communication links such as a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. In wireless implementations, the computing device may comprise one more interfaces and/or components for wireless communication such as one or more transmitters, receivers, transceivers, amplifiers, filters, control logic, wireless network interface cards (WNICs), antennas, and so forth. Although certain embodiments may be illustrated using a particular communications media by way of example, it may be appreciated that the principles and techniques discussed herein may be implemented using various communication media and accompanying technology.

As shown in FIG. 1, the application management framework 100 may be implemented by and run within a web browser 105. The web browser 105 may be implemented by a desktop and/or mobile version of a web browser such as Internet Explorer®, Mozilla®, Firefox®, Safari®, Opera®, Netscape Navigator®, and/or any other suitable web browser in accordance with the described embodiments. In various embodiments, the web browser 105 may support the computer programming languages, standards, web protocols, and/or technologies required by the application management framework 100. Such computer programming languages, standards, web protocols, and/or technologies may include, but are not limited to, HTML, XHTML, XML, Flash®/ActionScript, Macromedia® Flash®, JavaScript, ECMAScript, JScript, Basic, Visual Basic®, Visual Basic® Scripting Edition (VBScript), CSS, Asynchronous JavaScript and XML (Ajax), Flex®, Java®, Python, Perl®, C#/.net, Flash®, and/or other suitable programming, scripting, or VM-based languages. In addition, the web browser 105 may support "local" surfing, where "localhost" resources may be accessed with no requirement for connectivity to a network. It can be appreciated that some present day web browsers may attempt to connect to a network even when only localhost resources are needed, which may interfere with the operation of some embodiments.

In various implementations, the web browser 105 may provide the basis of the user interface and may include a language interpreter such as a script interpreter for computer programming languages such as JavaScript®, Flash®, VBScript, and/or other scripted programming languages where browser-based scripts, bytecode sets, or languages are interpreted in real time by runtime interpreter. The web browser 105 may provide a platform for running web applications in the web browser 105 using various web technologies such as HTML, XHTML, XML, Asynchronous JavaScript and XML (Ajax), and so forth.

In general, the application management framework 100 may be written in any computer programming language supported by the web browser 105 such as in one or more programming, scripting, or Virtual Machine (VM) based languages. For example, various standard web technologies such as HTML, CSS, JavaScript, ECMAScript may be applied to create the application management framework 100. Since many web page authors are familiar with these technologies, the benefits of using the application management framework will be readily apparent. It can be appreciated that development using web technologies is generally much faster and easier than is the case for specialized native programming languages such as C, C++, and so forth. Further, such native programming languages often require expensive development tools for mobile devices. For web applications, however, a wide array of freely available or inexpensive software development tools makes web application development possible for a much larger community of developers.

As shown, the application management framework 100 may comprise and encapsulate one or more web applications such as web applications 110-1 through 110-N, where N is any suitable positive integer value in accordance with the described embodiments. The web applications 110-1 through 110-N each may be written in any language supported by the web browser 105. The source code for the web applications 110-1 through 110-N and for the application management framework 100 may be highly portable across a wide array of hardware and software platforms such as desktop computers, mobile phones, and so forth. Additionally, a central server can pre-load the set of web applications 110-1 through 110-N into the application management framework 100 and serve the entire application management framework 100 to many computing devices. In some embodiments, the web applications 110-1 through 110-N may comprise or be implemented within the application management framework 100 as one or more mini applications or widgets.

The application management framework 100 may allow a user to switch between and among the web applications 110-1 through 110-N quickly without having to re-launch the web browser 105 or HTML application environment. In various implementations, for example, a plurality of the web applications 110-1 through 110-N may run simultaneously within the application management framework 100. In one embodiment, the web applications 110-1 through 110-N may run in an HTML "iframe" within the application management framework 100. When multiple web applications are already running and resident in memory, switching between and among the web applications generally requires very little time, thereby improving the user experience.

The application management framework 100 may capture user interaction events, such as mouse clicks, stylus clicks, keyboard input, jog wheel input, touchscreen input, voice input, button input, and so forth. The application management framework 100 may selectively pass one or more captured events to one or more of the web applications 110-1 through 110-N contained in the application management framework 100. This facilitates creation of a group of web applications that together have a common set of user input controls. Additionally, it simplifies web application development for devices with limited input controls. For example, on a mobile telephone it is advantageous to permit control of a web application with one finger. In various embodiments, the application management framework 100 may support the ability of a user to switch between and among the web applications 110-1 through 110-N quickly using a single finger or "mouseover" action providing for a pleasant user experience.

The application management framework 100 may control aspects of the one or more of the contained web applications 110-1 through 110-N. For example, the application management framework 100 may control which web application is visible to the user at a given time, whether a web application is actively processing data, and/or when to direct a web application to be "refreshed" or reloaded into the web browser 105. The application management framework 100 also may prompt one or more of the contained web applications 110-1 through 110-N to reload or update its data.

In various implementations, the application management framework 100 may provide a mechanism for developers to incorporate multitasking into one or more of the web applications 110-1 through 110-N. For example, by programmatically "hiding" a web application using a hidden frame, the application management framework 100 may allow a web application to run in the background while the user sees the user interface of a different web application.

The application management framework 100 also may provide a mechanism by which developers may incorporate web-based advertising into their web applications. For example, the web applications 110-1 through 110-N may use existing advertising link and scripting methods, yet be viewable on a wide range of devices, including computers and mobile phones. One or more of the web applications 110-1 through 110-N may include banner advertisement and/or may themselves be advertisements controlled and configured by the application management framework 100. It can be appreciated that the application management framework 100 makes possible a business method of providing free or low-cost web applications to end users where advertising revenue may be shared among web application developers, device makers, service providers, and even end users. This creates a participation incentive for all involved.

Figure 2:
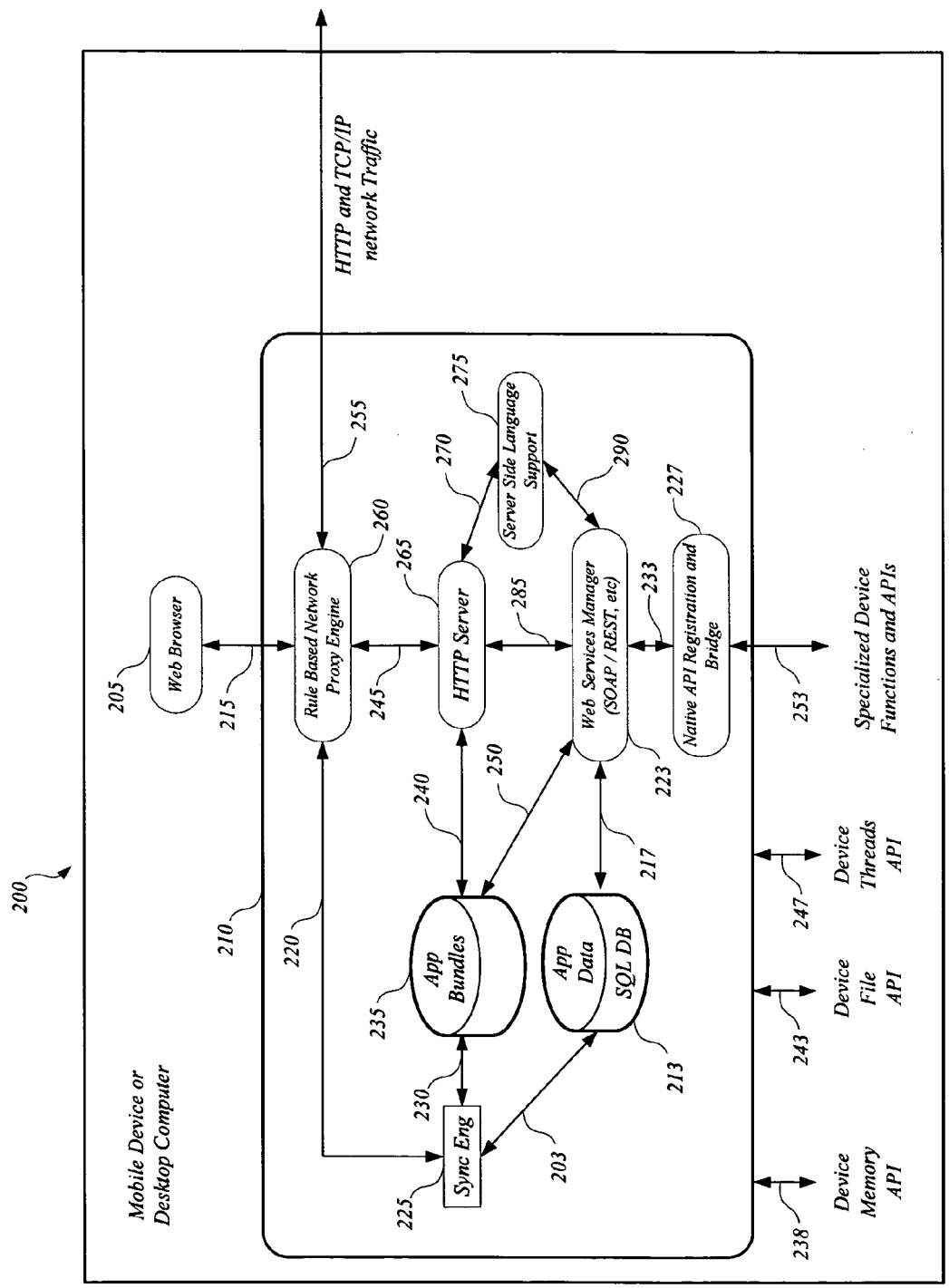
FIG. 2 illustrates an embodiment of a computing device including a web browser and a Web Virtual Machine.

FIG. 2 illustrates a computing device 200 suitable for implementing various embodiments. As shown, the computing device 200 may comprise a web browser 205 and a Web Virtual Machine (WebVM) 210. In various implementations, the application management framework 100 may interact with the web browser 205, as described herein. In such implementations, the capabilities of the application management framework 100 may be combined with the capabilities of the WebWM 210.

In general, the WebVM 210 may implement a local web host to provide server functionality on the computing device 200 and to serve local applications to the web browser 205. When implemented as a server on the computing device 200, the WebVM 210 may support and provide access to multiple applications. The WebVM 210 may run server side code such as PHP, Python, PERL or CGI programming environments locally on the computing device 200. The WebVM 210 also may implement web methods programming interfaces and web services extensions via SOAP, XML RPC, REST, and the like for enabling access to local resources of the computing device 200. Accordingly, the computing device 200 may provide server side interfaces to access local resources such as a file system, a phonebook, a media store, a database, a hardware component (e.g., camera, microphone, etc.), a software component, and/or other controlled resource of the computing device 200. Such interfaces also may implement server side code for allowing the user to write to a local resource such as a phonebook, media store, and so forth.

The WebVM 210 may implement security measures such as secure HTTP (https) and/or other login methods to obtain user authentication for preventing unauthorized access and use of the applications and/or other resources. The WebVM 210 may be configured to intermediate between the applications on the computing device 200 and the web browser 205 to broker local services and ensure that only a trusted entity is given access to specific functionality. The WebVM 210 also may implement various web based security models and access restrictions for evaluating function calls from a web browser which request access to local resources of the computing device 200.

When combined with the WebVM 210, the application management framework 100 may provide several additional advantages. For example, one or more of the web applications 110-1 through 110-N within the application management framework 100 may interact with local web applications or native applications running on a local server within the WebVM 210, all within the computing device 200 itself. This is advantageous during times when the computing device 200 is not connected to a network, or when there is a need to store data from a web application locally on the computing device 200. In various embodiments, resident or nonresident web applications such as widgets may include the ability to publish a notify to a home screen of the computing device via an offline proxy implemented by the WebVM 210.

Additionally, a web application within the application management framework 100 may utilize the proxy services of the WebVM 210 to access data or services from a different website than the website from which the initiating web application originated. Generally, the "origin policy" used for web applications prevents this behavior such that a script running in a web browser is only able to access or modify data at the website from which the script originated. The application management framework 100, when combined with the WebVM 210, provides a mechanism to work around this limitation. A suitable security policy may then be implemented within the WebVM 210.

Furthermore, the WebVM 210 can cache frequently needed data so that it is immediately available to a web application, without requiring the user to wait to access the data using the network. This vastly improves the overall user experience, so that it feels to the user that data is always available, even if the connection to the network is low or unavailable.

FIG. 2 depicts one possible implementation of a WebVM 210 configured to run on a computing device 200 such as mobile device (e.g., mobile device 100) or desktop computer. In various embodiments, the Web Virtual Machine (WebVM) 210 may be implemented as described in U.S. patent application Ser. No. 11/612,282 titled "System for Running Web Applications Offline and Providing Access to Native Services," which was filed on Dec. 18, 2006 and is entirely incorporated by reference.

As shown, the WebVM 210 interacts directly with the web browser 205 via a connection 215, which may be implemented as an http network connection which runs on the computing device 200. Typically this can be invoked by the web browser 205 connecting to a local host IP address (e.g., 127.0.0.1) or other suitable addresses or address and port combinations. Accordingly, different applications may be served by the WebVM 210 simultaneously on the different address port combinations and at different security levels with each application having different permissions levels and access rights to local resources.

The WebVM 210 connects to device services through application programming interfaces (APIs) including Device Memory API 238, Device File API 243, Device Threads API 247, and Specialized Device Functions and APIs 253. It is noted that WebVM 210 uses APIs 238, 243, and 247 to connect resources that facilitate internal operation such as memory access, file system, and task/threading and are also used for porting of the WebVM 210 among different classes of devices and operating systems.

The interface 253 may be implemented as one or more meta-interfaces which represent the expandable nature of the WebVM 210. Using SOAP, REST, or other web services bindings, web programs running either in the WebVM 210 or via the web browser 205, such as through Ajax, can access special services to the computing device 200. For example, the computing device 200 may include a phonebook or a digital media store for an on-device camera available as a C++ or Java service. By using the interfacing capabilities of the WebVM 210 through the interface 253, it is possible to let web applications run locally on the computing device 200 (e.g., mobile device or desktop computer) without outside server dependencies to be able to access local services and maintain a client-server programming model based on web programming techniques and with web security models intact. For example web-based phone book application could access the local phonebook on the computing device 200 via the interface 253 and then store associations locally in an a local SQL database 213 to create hybrid functionality. Later the same web application can send or store the phonebook information retrieved via interface 255 to an online web portal on the internet.

In accordance with some embodiments, the interface 253 may comprise a Device Caller ID API. Using SOAP, REST, or other web services bindings, web programs running either in the WebVM 210 or via the web browser 205, such as through Ajax, can access special services to the computing device 200. For example, the computing device 200 may include a phonebook, call log, and access to caller ID information on the computing device 200 which may be available as a C++ or Java service.

In operation, the WebVM 210 operates several portions of an http server stack as depicted by the interaction of the web browser 205 and a network proxy 260 through a path 215. The network proxy 260 may comprise a rule based network proxy engine implementing a software stack which redirects incoming network traffic either to the outside world via an interface 255 or towards an http server 265 via a path 245. For example, a browser-based application authored in XHTML and running a local scripting language (in the web browser 205) such as JavaScript or VBScript may request a new resource such as a new page or an XMLHttpRequest type data call. This request will be brokered from the web browser 205 through the network proxy 260 to the http server 265 for handling. If the request is for a web page, query to a server (e.g., web advertising server), or similar addressable asset, the http server 265 can then pull the resource and serve it back to the web browser 205. The http server 265 can fetch the resource from one of several local objects including a locally mounted file system implemented by the http server 265 and a local application bundle manager 235 which is connected to the http server 265 via a path 240.

If the request is a data call or a callback function to a server side scripting language (e.g., PHP, Python, Java Enterprise Edition, servlets or Common Gateway Interface Scripts), the http server 265 will hand the request off to a processing engine. In the case of a server side scripting language, the request is handed via a path 270 to a server side language support processing engine 275 which handles the request, provides language specific features, and maintains session management information or server side variables. If the request is via web description language interface (e.g., SOAP, WSDL, REST, XML remote procedure call, or similar function), then the request can be handed off via a path 285 to a specialized web services manager 223 which functions as previously mentioned to complete the request functionality. It is also possible to use the server side language support processing engine 275 to complete the call via a path 290 to the specialized web services manager 223 thereby enabling either Ajax only applications (e.g. applications which only have browser-based code and logic) or server-based code and logic to share SOAP/REST/Web services plug-ins. In some cases, the web services manager 223 may access the interface 253 via path 233 and native API registration and bridge 227.

The WebVM 210 also can provide access to a local SQL database 213 which is connected to the web services manager 223 via a path 217. The local SQL database 213 provides the ability to store end user data such as preferences, location, or profile information. In some embodiments, the local SQL database 213 may store advertisements and caller ID information. Applications running in the web browser 205 can access the local SQL database 213 via server side scripts running in the server side language support processing engine 275 or via a direct web services software call (e.g., SOAP call) which is issued directly through the web services manager 223. The local SQL database 213 also connects to a data synchronization engine 225 via a path 203. Application resources are stored as application bundles in a database implemented by the application bundle manager 235 which is directly connected via a path 240 to the http server 265. The database implemented by the application bundle manager 235 is also connected to the data synchronization engine 225 via a path 230.

In various implementations, an application bundle 225 can also be fully serviced with or without the HTTP server component by using a message passing interface 250 to interact with the web services manager 223. This allows applications to have direct non-socket based services fulfilled to access local hardware or storage in an efficient manner. Examples of interface 250 may comprise intra-message passing frameworks such as the Linux DBus or other suitable message passing framework. For example, the web services manager 223 may communicate with the application management framework 100 over a direct message passing interface. In this model the application environment is dedicated—not just the browser, but browser-like. In other words, a browser rendering engine, such as a webkit renders HTML along with helper libraries for executing JavaScript/ECMAscript but it is not the browser application per se. That is, the user does not realize they are in a browser environment.

The application bundle manager 235 manages entire web application assets. An application may be served from a web archive comprising a collection of the necessary application files for a web application. The web archive file may comprise a bundle or package of the web assets of the web application including index files, HTML files, script files (e.g., JavaScript or server script such as PHP, Python or Perl), graphics (e.g., JPEGs, GIFs), animations, directories, and other web application components. The web archive can be packaged, stored, and compressed using file archiving libraries such as zip, gzip or zlib, or other suitable packing schemes.

When a request is made to a particular file which may be stored as a part of an atomic bundle comprising the application assets, the network proxy 260, the http server 265, and the application bundle manager 235 work in succession to resolve the file just as if it had been hosted on an Internet server. These components also work to resolve same origin policy security enforcement in much the same way that a browser cache does. In other words, xyz.foo.com/mypage.xhtml can be stored locally but accessed in a programmatic way rather than as the browser cache which acts in an automatic (non-programmatically controlled) method. Universal Resource Locators (URLs) which explicitly resolve to local addresses (such as ports running on 127.0.0.1, the http loopback address) resolve and are served to the local web browser 205 via the http interface 210. In some cases, the web browser 205 may not be explicitly aware of the location which actually serves the file.

Additional functionality of the WebVM 210 is provided by using the synchronization engine 225 to update the locally stored applications, such as those stored in the database of the application bundle manager 235 and in the local SQL database 213 via paths 230 and 213, respectively. This allows applications stored as bundles to be atomically stored on the computing device 200 as a single file. The synchronization engine 225 can then manage the storage, updating, upgrading, and subscription status of several such applications. For example a server could store information about a subscription application which the local synchronization engine 225 would enforce. When the subscription expires, the application bundle would be disabled or deleted. This functionality extends the type of application storage once associated with dedicated runtimes (e.g., Java Micro Edition) to web-based applications.

In addition, the synchronization engine 225 can store, synchronize and manage application data stored in the local SQL database 213. In a typical (server-based) application, user data (e.g., shopping cart information on an e-commerce based web store or photographs on a photo sharing website) would be stored on that database of that site. Via the WebVM 210, however, the ability to utilize web-based protocols to store application data locally is now available though web services calls. Moreover, the synchronization engine 225 can then move user data stored in the local SQL database 213 back to a classically running server at an Internet URL. The synchronization engine 225 therefore allows both applications and user data to be stored locally on the computing device 200. Should the computing device 200 be lost or the user acquire a newer, perhaps upgraded device, the applications and the application data for the user can be seamlessly re-provisioned to the new device.

The synchronization engine 225 also can access the external Internet through the network proxy 260 by using a path 220. This allows the synchronization engine 225 to move code assets and user and application data stored in the either the database of the application bundle manager 235 or local SQL database 213 and maintain them in accordance with business rules for subscription or provisioning of the user applications. Since it uses databases to store application bundles and user data, the WebVM 210 can also support different application permissions for different users allowing some to have access to more or different data than others.

The WebVM 210 also may implement various techniques as described in U.S. patent application Ser. No. 11/382,058 titled "Method for Synchronizing Software Application and User Data for Asynchronous Client-Server and Peer to Peer Computer Networks," which was filed on May 8, 2006 and is entirely incorporated by reference. Accordingly, the WebVM 210 may support the creation of offline web applications and managing associated user data which is created offline that must later be reconciled with one or more central servers without a data collision. This provides knowledge of which version of different pieces of user data are new and which needs to be added to centralized servers. This applies to the actual web application program files so that software applications can be synchronized in addition to user data enabling a transparent online and offline user experience. Data sets can be distributed in manner which allows peer to peer synchronization and filedata distribution. The amount of transactional data required to synchronize data sets across a network can be minimized to increase efficiency of available bandwidth on a computer network.

The WebVM 210 also may implement an offline automated proxy cache as described in U.S. patent application Ser. No. 11/873,305 titled "Offline Automated Proxy Cache for Web Applications," which was filed on Oct. 16, 2007 and is entirely incorporated by reference. The offline automated proxy cache may support scheduling and automatic repeating of requests for updated data. In various embodiments, scheduling parameters may be used to automatically retrieve updated versions of requested content behalf of a publishing application while the publishing application is offline (e.g., closed, runtime not running, VM not running, etc.). In such embodiments, the WebVM 210 may make repeated Ajax requests on behalf of the publishing application which are repeatedly scheduled to run, even when the publishing application is not running. The publishing parameters may comprise scheduling parameters including, for example, a time interval parameter that defines a time interval for requesting data updates, a history parameter defining a maximum number of versions of the data that may be cached simultaneously, a data expiry parameter specifying when data in the cache expires, a retry parameter defining a number of times to retry a connection, and others.

Repeating/auto-scheduled requests may be terminated by overwrite (e.g., if the publishing application sends an identical request with no scheduling parameters, then scheduling is removed), by explicit request deletion (e.g., if the publishing application sends a parameter to delete the published request via serial number then the auto scheduled request is removed), by application deletion (e.g., if the publishing application is deleted by the user or the operating system, then all autopublish, and proxy requests associated with the application are removed from the system), by programmatic flush (e.g., an API exists on the proxy publisher to suspend a given or all proxy-publish requests), and/or by timeout (e.g., if a given publishing application does not renew the proxy publish request in a given time such as two weeks, then the proxy publisher may allow the repeated proxy request to age out, stop repeating, and be deleted from the queue along with any stored data and rules).

In various embodiments, some or all the above publishing parameters may be wrapped in a namespace determined by the application using the WebVM 210. This namespace wrapping may be performed automatically. For example, if a publishing application such as MySuperWidget.wgt calls the WebVM 210, the stored query and request data will be put in a namespace or table which is prefixed by MySuperWidget. In this way different applications can store requests with the proxy, and the results will be kept separate to avoid naming conflicts (e.g., two different vendors using the same variable name). Reverse URL naming (e.g., com.lampdesk.MySuperWidget) is explicitly encouraged for some implementations. In addition, a public namespace also may be provided for intercommunication messaging.

The WebVM 210 also may implement an application runtime environment as described in U.S. patent application Ser. No. 12/019,362 titled "System and Methods for Providing Granular Security for Locally Running Scripted Environments and Web Applications," which was filed on Jan. 4, 2008 and is entirely incorporated by reference. The application runtime environment may provide finer granularity and control at the function level rather then forcing an all or nothing approach to control over an application where the application either runs completely unfettered or is completely blocked from running. In particular, the application runtime environment may allow scripted runtime based applications to call local functions in a signed manner with function call level control.

With respect to web archives, the collection of web assets for a web application may be treated as a single file which can be signed and distributed in a secure fashion. A signing file (e.g., manifest file) may be automatically generated when bundling the web archive to provide details as to the APIs (e.g. SOAP calls) an application uses at signing when the application is registered with the certifying authority. When provided with a list of native functions to be used by an application, both the signing authority and the system where the application is eventually installed can compare functions that the application attempts to use against the list of functions which were signed and authorized. This provides an extra layer of security for the target operating system and implementation of system wide security policies to determine whether to allow an application to be installed and whether the functions that an application uses violate such policies.

The decision to execute a function call may be delegated in real-time to the operating system so that overall security is consistent with the blanket security policies of the operating system. By giving responsibility for allowing function calls to the operating system, platform level security control at the API level may be implemented across multiple runtime environments and requiring the runtime environments to only track which application is requesting what service. Accordingly, the operating system may maintain control of security and access for scripted applications and minimize the amount of security authority that must be deferred to the various application runtime environments.

The application runtime environment also may couple the signing process and installation of virtual machine or scripted runtime layer based applications back to core operating system in a unified way. In particular, the operating system may be involved in the accepting of signed scripted or bytecode based applications when granting permission to install an application. In addition, by using IP address and port address combinations, multiple separate web application running on the same local computing device may be tracked and kept separate. Accordingly, different security levels may be enforced among multiple applications running on the same device and application integrity may be persevered even if one of the applications is a "rogue" application.

The WebVM 210 also may implement a proxy publisher as described in U.S. patent application Ser. No. 12/116,697 titled "Automatic Conversion Schema for Cached Web Requests," which was filed on May 7, 2008, which is entirely incorporated by reference. The proxy publisher may implement an automatic conversion schema which allows data results from a publishing application to be extracted and displayed by a display application other than the publishing application. For example, the proxy publisher may receive a request from a publishing application to retrieve a data result from a data server. The request may include a path to the data server and appended publishing parameters. In accordance with the automatic conversion schema, the publishing parameters may comprise decode parameters associated with the publishing application for allowing a display application other than the publishing application to decode variables of the data result and to transform the decoded variables for display. The proxy publisher may cache the request including the appended publishing parameters and retrieve the data result from the data server. The proxy publisher may locally store the data result along with the cached publishing parameters and may respond to a query from a display application for data associated with the publishing application by providing the cached data result and the publishing parameters to the display application.

In one exemplary embodiment, the publishing application may comprise an XHTML widget written in JavaScript and XHTML. The proxy publisher may receive a request (e.g., Ajax request) from the publishing application to retrieve a data result over the Internet from a remote data server. The request from the publishing application may include a path to the remote data server such a Uniform Resource Locator (URL) and appended publishing parameters.

The proxy publisher may process the request from the publishing application by caching the request including the appended publishing parameters and passing through the path to the remote data server. The remote data server may respond in normal fashion by returning a data result. The proxy publisher may receive the data result from the remote data server and process the data result by locally storing the data result with the cached publishing parameters for the publishing application.

The publishing parameters may comprise decode parameters associated with the publishing application for allowing a display application other than the publishing application to decode variables of the data result and to transform the decoded variables for display. The decode parameters may name the variables which can be extracted to publish a minimized representation of the publishing application. For example, a widget may publish a minimized representation of a weather application by releasing only the day's high temperature or a minimized representation of an e-mail application by releasing only the number of unread messages.

The decode parameters also may comprise data extraction rules and data formatting rules for instructing the display application how to extract web-request data (e.g. weather) from data result (e.g., response text), how to format the data (e.g. put this string+with the extracted web-request data), and how to display the data (e.g., display supplementary information such as a URL or text along with the response text).

Subsequently, the proxy publisher may receive a query from the display application. In some cases, the display application may request data from a specific named request. For example, the display application may request data associated with the publishing application. In other cases, the display application may ask the proxy publisher for a listing of all names for currently stored non-private (published) request data. By default, the proxy publisher may return all the named rules if the display application does not ask for a particular name.

Upon receiving an available name selected by the display application, the proxy publisher may provide a matching result including the locally stored data results and the publishing parameters to the display application. The display application may process the matching result by using the extraction rules to extract and decode the variables and using the formatting rules to display the extracted values in an appropriate manner. In some embodiments, the proxy publisher may reduce the processing required by the display application by extracting the variables from the data result using the data extraction rules and providing the extracted variables to the display application along with the data formatting rules.

In general, when the publishing application is a web-based application, the display application may be implemented as a viewer application or mobile device home screen outside of the web browser which cannot render standard web based content. For example, the display application may comprise a C/C++ active home screen, news aggregator, billboard, or mobile device ticker where only a small amount of information is displayed but that requires transformation of the cached data results to be usable. By using the decode parameters provided by the publishing application, the display application can transform the cached data into a format that it can use. Once the display application has obtained the variables in a usable format, the display application may republish the data in another format.

In accordance with the automatic conversion schema, the publishing parameters may comprise decode parameters for allowing the display application to decode variables of the data result and to transform the decoded variables for display. The decode parameters may comprise a name parameter (e.g., var_name) and a variable name for allowing the publishing application to name the variables extracted. The variable name may be used by outside applications to address a parameter left by the web application. The variable name may not be the name encoded in the offline proxy request, but it is the name (e.g., "Temp_Hi") referred to by an outside application.

The decode parameters may comprise a data extraction rules parameter (e.g., extraction_rules, var_extract_regex) and instructions for extracting information from the response or data result. The publishing application may cause the proxy publisher to store, with the information request, instructions for extracting information from the response. The extracting instructions may be used by an outside application (e.g., display application) or the proxy publisher to extract (find) the information referred to by the name parameter (e.g., var_name) from the stored offline proxy request.

The extracting instructions may be implemented as a regular expression (regex) (e.g., JSON call): get_bytes[23-28] or a "capturing regular expression" in a server side scripting languages such as PERL regex. The extracting instructions also may be implemented via XPath or XQuery. The extracting instructions also may comprise an XSLT transformation. The extracting instructions also may comprise a custom program which is, in itself, the instructions for processing the request. For example, the stored instructions for extracting information from the data result may be implemented as an XHTML page containing JavaScript.

The decode parameters may comprise a data formatting rules parameter (e.g., formatting_rules) and instructions for displaying variables from the data result in a format used by an outside application (e.g., the display application). The publishing application may cause the proxy publisher to store, with the information request, a set of optional separate instructions for how to display and format the extracted data. The formatting instructions may comprise a string which is what an extracting application can display in an alert dialog. This parameter can be duplicated with different language parameters. The formatting instructions can be a transforming rule-set which takes the extracted value and displays it in a certain format (e.g. if 2007.04.11 is the date, then it is transformed via a regex to Apr. 11, 2007) such as via XSLT. The extraction instructions are used to extract the data returned by a server located at the URL formed by the calling application (e.g., publishing application), and the formatting instructions detail how the extracted data should appear in a certain application (e.g., display application) outside of the calling application.

The formatting instructions may be implemented by a regular expression (regex) separate from the regex used to extract the data. The formatting instructions also may comprise an XSLT transformation. The formatting instructions also may be implemented as a stored program in its own right. For example, the stored program is itself passed as a parameter which takes the extracted data and displays or formats the extracted data in a way which an outside application other than the calling application can use and process. For example, the stored program may comprise a scripted application such as XHTML+JavaScript. The display and formatting instructions also may be implemented by a custom language created for the purpose of formatting the extracted data. The display and formatting instructions also may be implemented by A C/C++ sprintf( ) capable string function parameter.

The decode parameters may comprise a private parameter (e.g., set_request_private) which may be implemented by a flag set so that the offline proxy request will not be readable by outside applications. The publishing application may deliberately not expose its data by directing the proxy to never honor a request from certain applications to provide security. As such, certain application may be prevented from receiving cached data results and publishing parameters for a given publishing application. Accordingly, the publishing application may make offline requests that are private (not shared) with other applications.

The publishing parameters may comprise event parameters or commands for asking the proxy publisher to perform actions on behalf of the application outside of request handling to allow web applications to behave as normal applications but with a background wakeup task. Whether the optional parameters can be executed is security level and operating system dependent. The event parameters may comprise a wake upon (condition) parameter or command for requesting the proxy publisher to wake up (launch) an application when a certain offline proxy condition is met (e.g., e-mail received). Whether the application will actually be launched is left to security permissions or the operating system. The proxy publisher may implement an operating system service for sleeping applications to publish services which can be read and passed to other applications. For example, a C/C++ application can use the proxy publisher to post a request which self updates and presents a shared publishable result. In general, any compiled (statically linked) application can use the proxy publisher to wake up when a certain wake up condition is met.

The event parameters may comprise an alert_upon (condition) parameter or command for requesting the proxy publisher to post an alert to the operating system when a condition is met (e.g., publishing application needs attention). This allows a web application to post information via the proxy publisher. The response may be a posted message in a dialog box or a textual or iconic notification on the home screen/idle screen of the device. For example, a scripted widget application running on a cell phone device may provide an e-mail viewing service and may set an event such that when the proxy publisher discovers a new e-mail, an event request is posted to the device idle screen so that the user knows to look at their e-mail. The alert parameters also may comprise an optional alert_msg, parameter and an optional alert_urgency parameter.

The offline capabilities of a publishing application may be restricted in accordance with operating system security policies. For example, the proxy publisher may interact with the operating system security policies and permissions to restrict use of publishing application offline capabilities. In some embodiments, the proxy publisher will, for security purposes, include the application signature ID or referring page for the operating system to determine whether to execute a request in response to a wake up or alter condition.

The WebVM 210 also may be implemented as described in U.S. patent application Ser. No. 12/061,179 titled "System and Methods for Providing Access to a Desktop and Applications of a Mobile Device," which was filed on Apr. 2, 2008 and is entirely incorporated by reference. Accordingly, one or more web applications hosted on the computing device 200 may be configured to be accessed by a web browser running on a terminal separate from the computing device 200. In various implementations, the UI displayed by the terminal may comprise an enhanced interface as compared to the UI of the computing device 200. For example, an application on a mobile device may be configured to serve up a UI comprising a phone-centric interface to the browser of the mobile device and configured to serve up a UI comprising an enhanced (e.g., larger/better/different) interface when connected to the browser of the terminal. In general, an application may serve a simplified interface to display on the mobile device and an enhanced interface to take advantage of the larger and/or more useful assets (e.g., larger screen, a full-size keyboard, a mouse, memory, browser plugins, hardware, etc.) of the terminal. For instance, an application on a mobile device which uses 4-way navigation and 2 soft keys when in a phone mode may serve an enhanced UI to the terminal that can use navigation hardware such as the full keyboard and mouse and that displays more content in the larger screen of the terminal.

The use of web-based technologies may allow a mobile device to deliver rich data applications such as small widgets or even conventional larger applications. In some cases, for example, a mobile device may be configured to host and run PC applications. In such cases, an enhanced version of the application may be run when accessed by the terminal while a simpler version of the application runs when accessed by the hosting mobile device. The application may be configured to support both environments without requiring modification of the application in the process. As such the application may detect its environment and run differently when used by the mobile device and when used by the terminal.

Figure 3:
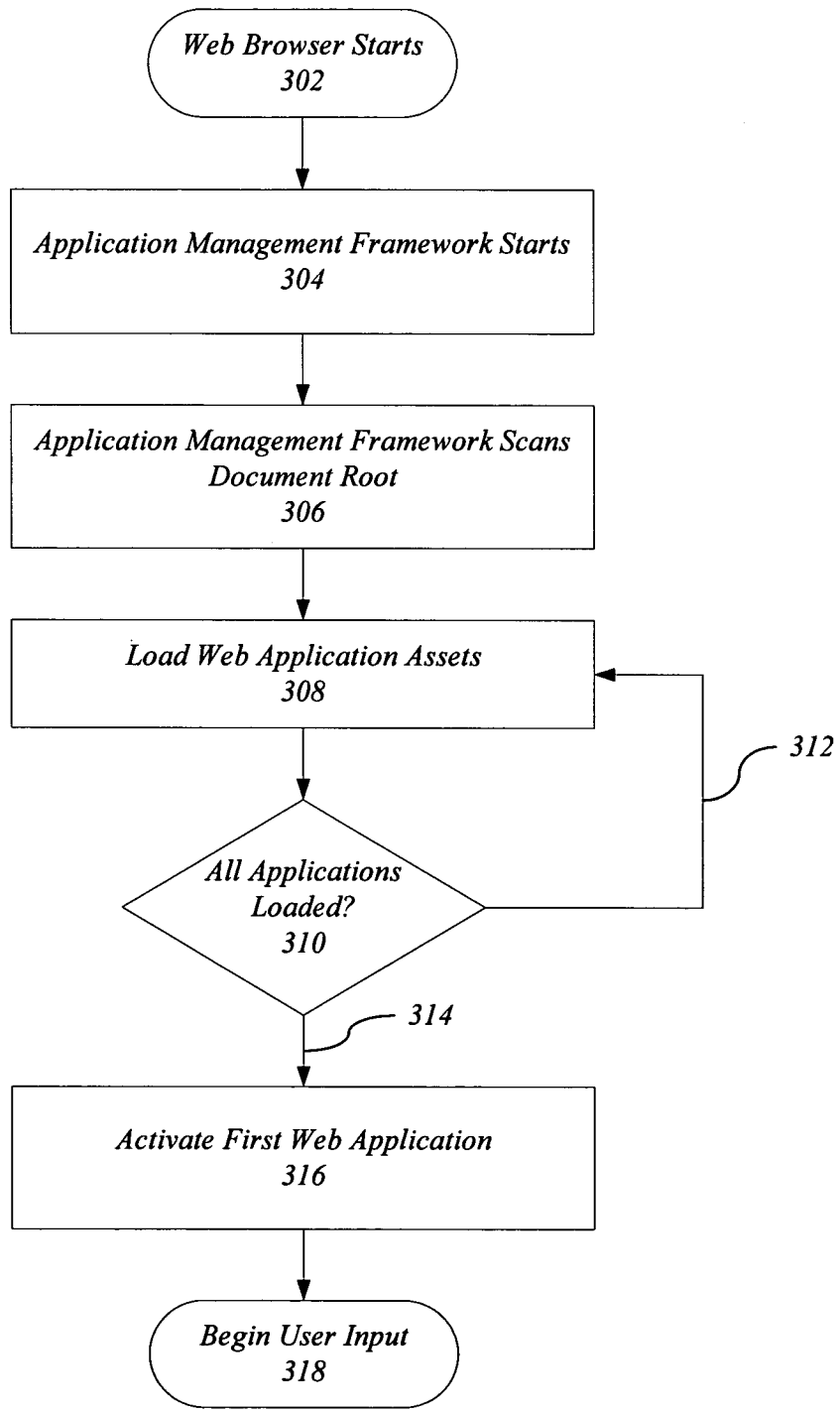
FIG. 3 illustrates an embodiment of a logic flow for initializing an application framework.

FIG. 3 illustrates one embodiment of a logic flow 300 for initializing the application management framework 100. The logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming instructions to be executed by a logic device (e.g., computer, processor).

In this embodiment, the user directs a web browser 105 to start the operation for initializing the application management framework 100 (step 302). For example, by starting the web browser 105 with command line arguments or by supplying a uniform resource identifier (URI), the user may specify the protocol, location, and name of the script for the application management framework 100. The web browser 105 uses this information to start the application management framework 100 (step 304).

In this exemplary embodiment, the application management framework 100 scans its document root to find available web application assets (step 306). The application management framework 100 then loads the web application assets for a first web application (step 308). If there are additional web applications available (step 310), the application management framework 100 repeats the process (step 312) for each web application. When all the web assets for all of the web applications have been loaded (step 314), the application management framework 100 activates the first web application (step 316) and prepares to receive user input events (step 318).

It can be appreciated that the logic flow 300 depicts an exemplary sequence for initializing the application management framework 100 and that alternative steps may be used to install one or more web applications in the application management framework 100. For example, in some cases, web applications may be inserted directly in the source code for the application management framework 100. Additionally or alternatively, the WebVM 210 may store one or more web publications to be loaded by the application management framework 100 at startup or upon request by the user.

In various embodiments, a list of web applications may be stored in "cookies" on the computing device of the user so that the web applications can be reloaded or configured. In some cases, the list of web applications may be served via server-side logic (e.g., SOAP, REST, JSON, etc.). Some embodiments may use server-side languages (e.g., PHP) to permit building of a web application launcher that may be customized by the user and/or by the web application developer. Certain embodiments also may allow saving of user preferences, configurations, or web application data into a database implemented locally on the device of the user (e.g., via the WebVM 210) or on a network server. In addition, the application management framework 100 may be compatible with "plug-in" technologies such as Adobe PDF, Flash®, VMRL, and others.

Figure 4:
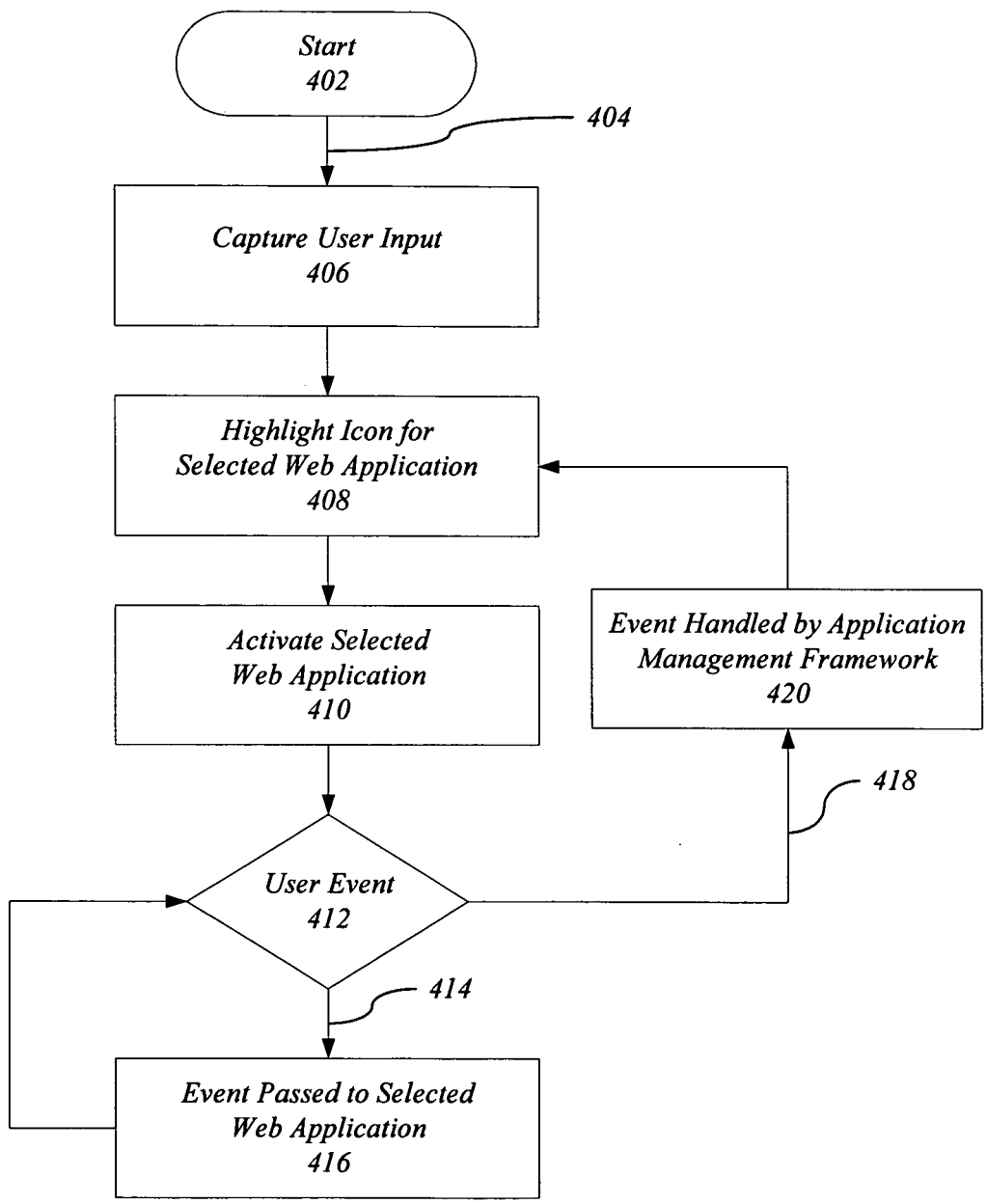
FIG. 4 illustrates an embodiment of a logic flow for handling events by an application framework.

FIG. 4 illustrates one embodiment of a logic flow 400 for handling events by the application management framework 100. The logic flow 400 may be performed by various systems and/or devices and may be implemented as hardware, software, firmware, and/or any combination thereof, as desired for a given set of design parameters or performance constraints. For example, one or more operations of the logic flow 400 may be implemented by executable programming instructions to be executed by a logic device (e.g., computer, processor).

In this embodiment, the application management framework 100 handles one or more events such as user interaction events. After the application management framework 100 and web applications are loaded, the application management framework 100 is ready to handle events (step 402). In this exemplary embodiment, a user may trigger an event by clicking a mouse button on a web application icon (step 404). The application management framework 100 captures the user input (step 406). Then, the application management framework 100 highlights the icon for the selected web application (step 408) and activates the selected web application (step 410). Once a web application is activated, the application management framework 100 responds to the user event (step 412).

If an event takes place within the selected web application (step 414), the application management framework 100 may pass this event to the selected web application (step 416). If an event takes place within the user interface of the application management framework 100 such as the user clicking on a different web application icon (step 418), the application management framework 100 may handle the event (step 420). In this exemplary instance, the application management framework 100 highlights the icon for the selected web application (step 408) and continues the subsequent process of the logic flow 400.

Figure 5:
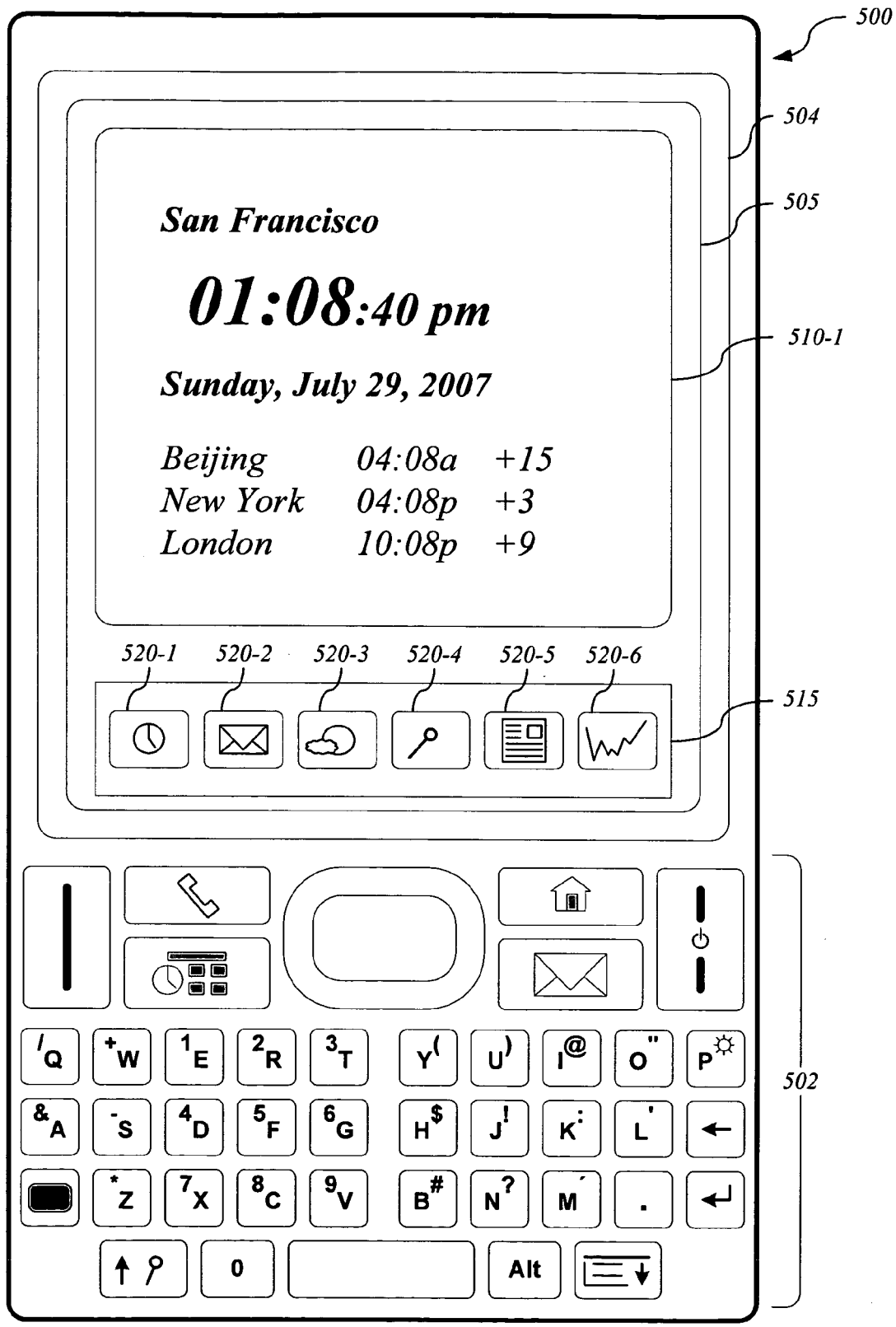
FIG. 5 illustrates an embodiment of a mobile device including web application and application management framework user interfaces.

FIG. 5 illustrates a mobile device 500 suitable for implementing various embodiments. As shown, the mobile device 500 may be implemented as a combination handheld computer and mobile telephone, sometimes referred to as a smart phone. It can be appreciated that the mobile device 500 may comprise a computing device having a handheld form factor. While certain embodiments may be described with the mobile device 500 implemented as a smart phone by way of example, the mobile device 500 may be implemented as other types of user equipment (UE) or wireless computing devices such as a mobile telephone, personal digital assistant (PDA), combination mobile telephone/PDA, handheld device, mobile unit, subscriber station, game device, messaging device, media player, pager, or other suitable mobile communications devices.

The mobile device 500 generally may be configured to support or provide cellular voice communication, wireless data communication, and computing capabilities in accordance with the described embodiments. The mobile device 500 may comprise various components for providing such capabilities including, for example, a printed circuit board (PCB), one or more processors (e.g., host processor, radio processor), one or more transceivers (e.g., voice communications transceiver, data communications transceiver, GPS transceiver), memory (e.g., volatile or non-volatile memory, removable or non-removable memory, erasable or non-erasable memory, writeable or re-writeable memory), internal and/or external antennas, a rechargeable battery, and others.

The mobile device 500 may provide voice and wireless data communications functionality by communicating with a mobile network such as a Code Division Multiple Access (CDMA) network, Global System for Mobile Communications (GSM) network, North American Digital Cellular (NADC) network, Time Division Multiple Access (TDMA) network, Extended-TDMA (E-TDMA) network, Narrowband Advanced Mobile Phone Service (NAMPS) network, third generation (3G) network such as a Wide-band CDMA (WCDMA) network, CDMA-2000 network, Universal Mobile Telephone System (UMTS) network, and others.

The mobile device 500 also may support wireless wide area network (WWAN) data communications services including Internet access. Examples of WWAN data communications services may include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others.

The mobile device 500 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and others.

The mobile device 500 also may be arranged to perform data communications functionality in accordance with shorter range wireless networks, such as a wireless personal area network (PAN) offering Bluetooth® data communications services in accordance with the Bluetooth® Special Interest Group (SIG) series of protocols, specifications, profiles, and so forth. Other examples of shorter range wireless networks may employ infrared (IR) techniques or near-field communication techniques and protocols, such as electromagnetic induction (EMI) techniques including passive or active radio-frequency identification (RFID) protocols and devices.

The mobile device 500 may comprise various input/output (I/O) interfaces for establishing connections to other devices. The I/O interfaces may comprise, for example, a serial connection port, an IR port, a Bluetooth® interface, a network interface, a WiFi interface, a WiMax interface, a cellular network interface, a wireless network interface card (WNIC), a transceiver, and so forth. Such connections may be implemented using various wired and/or wireless communication media in accordance with the described embodiments. Although certain exemplary embodiments may be described as using a particular communication media by way of example, it may be appreciated that the principles and techniques discussed herein may be implemented using various communication media and accompanying technology.

In some implementations, a connection may comprise a wired connection such as a Universal Serial Bus (USB) connection (e.g., USB host, USB net), Serial Bus Interface (SBI) connection (e.g., FireWire®), or other suitable wired connection to directly connect (e.g., tether, plug in) the mobile device 500 to a device when in close proximity. In other implementations, a connection may comprise a short range wireless connection (e.g., Bluetooth® connection, IR connection) to communicatively couple the mobile device 500 to a device when in close proximity. In some implementations, the a connection may comprise a network connection between the mobile device 500 and a device such as a WiFi connection, WiMax connection, Ethernet connection, cellular network (e.g., 1G/2G/3G) connection, or other suitable packet data or switched connection in accordance with the described embodiments.

The mobile device 500 may comprise various software programs such as system programs and applications to provide computing capabilities in accordance with the described embodiments. Exemplary system programs may include, without limitation, an operating system (OS), device drivers, programming tools, utility programs, software libraries, application programming interfaces (APIs), and so forth. Exemplary operating systems may include, for example, a Palm OS®, Microsoft® OS, Unix® OS, Linux® OS, Symbian OS™, Embedix OS, Binary Run-time Environment for Wireless (BREW) OS, JavaOS, a Wireless Application Protocol (WAP) OS, and others.

The mobile device 500 may provide a variety of applications for allowing a user to accomplish one or more specific tasks. Exemplary applications may include, without limitation, a web browser application (e.g., web browser 105), telephone application (e.g., cellular, VoIP, PTT), networking application, messaging application (e.g., e-mail, IM, SMS, MMS), contacts application, calendar application, word processing application, spreadsheet application, database application, media application (e.g., video player, audio player, multimedia player, digital camera, video camera, media management), location based services (LBS) application, gaming application, and so forth. The applications may comprise or be implemented as executable computer program instructions stored on computer-readable storage media such as volatile or non-volatile memory capable of being retrieved and executed by a processor to provide operations for the mobile device 500. The memory also may implement various databases and/or other types of data structures (e.g., arrays, files, tables, records) for storing data for use by the processor and/or other elements of the mobile device 500.

The mobile device 500 may comprise various components or devices for interacting with an application such as keypad 502 for inputting data and/or commands and a display 504 (e.g., touch-sensitive screen) for presenting one or more user interfaces and receiving user input. It can be appreciated that the mobile device 500 may comprise a variety of components or devices for use with one or more applications such as a stylus, keys (e.g., input keys, preset and programmable hot keys), buttons (e.g., action buttons, a multidirectional navigation button, preset and programmable shortcut buttons), switches, a microphone, speakers, an audio headset, a camera, and so forth.

In accordance with various embodiments, the mobile device 500 may comprise an application management framework 100 implemented by a web browser 105 and including multiple web applications 110-1 through 110-N, as described above. In some implementations, the mobile device 500 may further comprise a WebVM 210 interacting with the application management framework 100.

As shown, the mobile device 500 may present a web browser UI 505 as an instance of the web browser 105. The web browser UI 505 may display a web application UI 510-1 corresponding to the web application 110-1. In this embodiment, the web application 110-1 may comprise an active clock application or widget, and the web application UI 510-1 may display the local date and time for the mobile device 500 as well as the time in other locations. The web browser UI 505 also displays an application management framework UI 515 providing an interface for rapidly switching between the web applications 110-1 through 110-N and receiving a common set of input controls. In various implementations, the web browser 105 may comprise built-in widget controls implemented by the mobile device 500.

In one or more embodiments, the application management framework UI 515 may be implemented as a menu bar comprising a set of icons 520-1 through 520-M, where M is any suitable positive integer value in accordance with the described embodiments. The menu bar of the application management framework UI 515 may be implemented as an application flip tray comprising a page flipping UI such that the user can flip through web applications or widgets very fast in response to a single user event such as single screen touch (e.g., pressing or sliding), button press (e.g., navigation button, a dedicated hard key, a soft key), or interaction with auxiliary controls such as a jog-dial wheel. The user also may select or advance to a particular web application by using any combination of touchscreen events (e.g., touching or pressing on an icon), button events (e.g., mobile device 500 may have dedicated hard or soft key buttons for select, next, and previous), jog-dial events, and screen events (e.g., clicking an icon via a mouse or other random navigation events. In some implementations, the icon tray may auto-hide itself to reserve available screen area. In such cases, the icon tray may only appear momentarily when the user is switching between web applications using the aforementioned events.

As depicted in this exemplary embodiment, the set of icons 520-1 through 520-M includes icons 520-1 through 520-6 for switching between and among active web applications. As shown, the icons 520-1 through 520-6 may be implemented as a clock icon 520-1, a web mail icon 520-2, a weather icon 520-3, a search icon 520-4, a news reader icon 520-5, and a stock listing icon 520-6. The icons 520-1 through 520-6 may correspond, for example, to active web applications or widgets such as web applications 110-1 through 110-6 implemented as clock application 110-1, a web mail application 110-2, a weather application 110-3, a search application 120-4, a news application 110-5, and a stock listing application 110-6. It can be appreciated, however, that the arrangement and order of the icons 520-1 through 520-6 does not necessarily have to correspond to the order of the web applications 110-1 through 110-6. In some embodiments, for example, the user may set preferences, drag and drop, move, add, remove, and/or otherwise customize the set of icons displayed by the application management framework UI 515.

It also can be appreciated the positions and shapes of the components of the application management framework UI 515 are not limited to the embodiment shown in FIG. 5. The attributes of the application management framework UI 515 may be easily changed by modifying graphics elements or layout parameters of the underlying web page and are readily customizable by the web page author. For example, while the application management framework UI 515 is shown as a horizontal bar at the bottom of the web browser UI 505, it also may be placed in a vertical bar along the left side of the web browser UI 505. The application management framework UI 515 also may be hidden at times. As another example, any number of web application icons may be used, each corresponding to web application, as is practical.

Further exemplary embodiments are discussed below in which like reference numerals refer to similar elements as described above. It can be appreciated that any of the features, structures or characteristics described in the context of a particular embodiment are not limited to such embodiment and are not intended to suggest any limitation as to the scope of use or functionality of such embodiment.

Figure 6B:
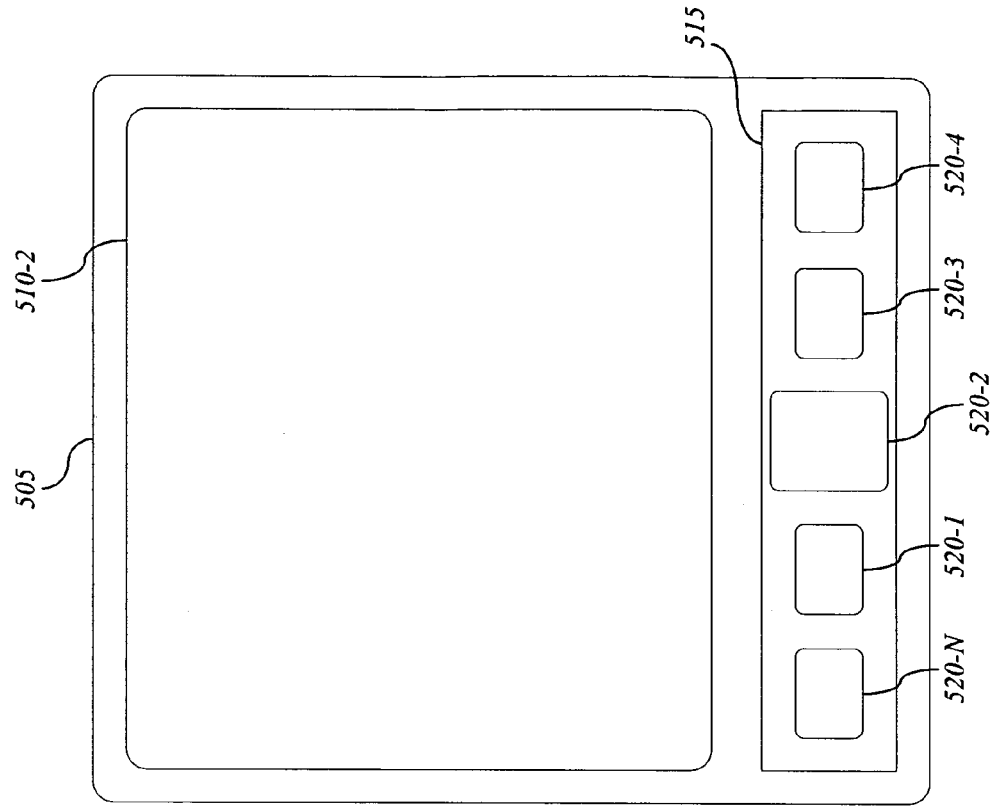
FIG. 6B illustrates another embodiment of web browser, web application, and application management framework user interfaces.
Figure 6A:
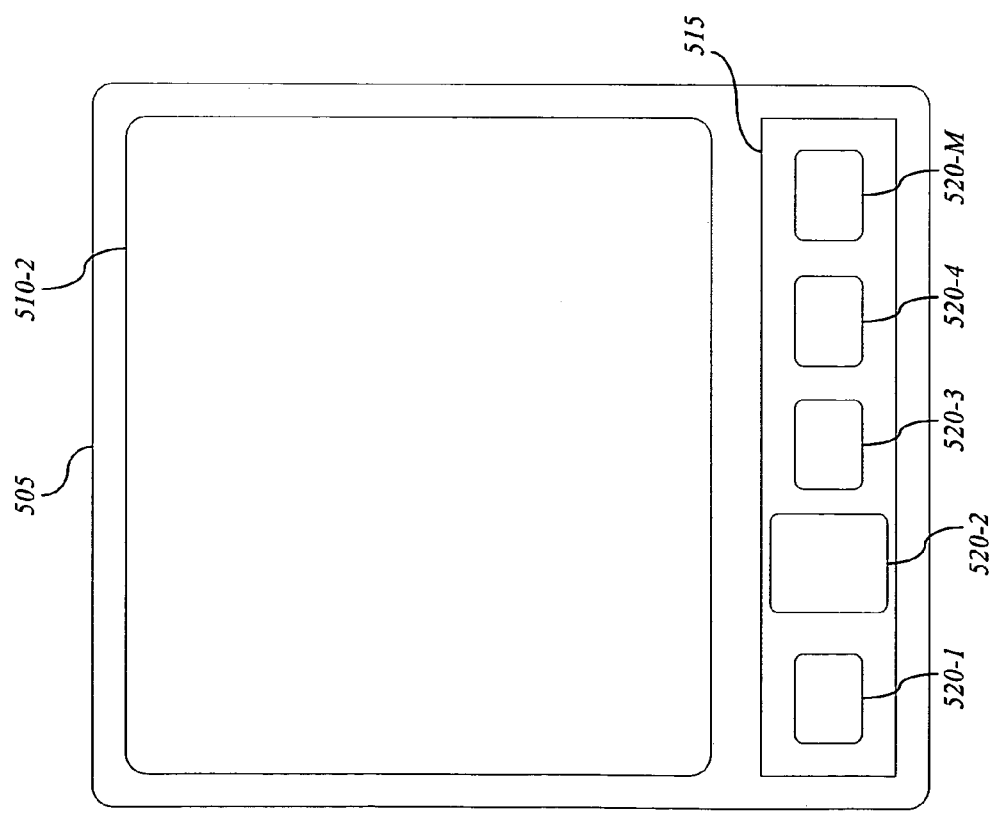
FIG. 6A illustrates an embodiment of web browser, web application, and application management framework user interfaces.

FIG. 6A illustrates one embodiment of a web browser UI 505 displaying a web application UI 510-2 and an application management framework UI 515. In this embodiment, the application management framework 515 displays a set of icons 520-1 through 520-M corresponding to web applications 110-1 through 110-M. As shown, a web application UI 510-2 corresponding to a selected web application 110-2 is visible to the user in the web browser UI 505 interface.

In this exemplary embodiment, the relative size of the icon 520-2 is larger than the other icons, indicating that its corresponding web application 110-2 is selected and that the web application UI 510-2 is visible to the user in the web browser UI 505. It can be appreciated that in other embodiments, the icon for the selected web application and visible web application UI may be distinguished by characteristics other than size such as shape, brightness, color, highlighting, and so forth and/or combinations of such characteristics.

FIG. 6B illustrates another embodiment of a web browser UI 505 displaying a web application UI 510-2 and an application management framework UI 515. In this embodiment, the application management framework UI 515 comprises a layout in which the icon corresponding to the currently selected web application is arranged in the center of the application management framework UI 515. In this exemplary embodiment, the relative size of the icon 520-2 is larger than the other icons, indicating that its corresponding web application 110-2 is selected and that the web application UI 510-2 is visible to the user in the web browser UI 505.

As shown in FIG. 6B, the layout of the application management framework UI 515 allows the mobile device 500 to manage more web applications than the number of icons configured to fit within the web browser UI 505 on the small display 504 at a single time. In one example, the application management framework UI 515 may be configured to display icons 520-1 through 520-M (e.g., M=5), while the underlying application management framework 100 comprises more web applications such as web applications 110-1 through 110-N (e.g., N=9). Instead of shrinking the icons for the web applications 110-1 through 110-N to fit within the application management framework UI 515, only the active icon such as icon 520-2 and five other icons are shown.

In this example, the icon 520-2 corresponding to the currently selected web application 110-2 and web application UI 520-2 in view is arranged in the center of the application management framework UI 515. To the right of the selected icon 520-2 is the icon 520-3 corresponding to the next web application 110-3. To the left of selected icon 520-1 is the icon 520-1 corresponding to the previous web application 110-1.

The application management framework UI 515 shown in FIG. 6B also implements modulus wrap-around functionality. For example, as the user advances to the left or to the right, some icons displayed in the application management framework UI 515 are replaced by other icons. After scrolling through to the icon corresponding to the last web application, for example, the icon corresponding to the first web application shows up via a modulus wrap-around.

In FIG. 6B, the set of icons displayed by the application management framework UI 515 is ordered as icon 520-N, icon 520-1, icon 520-2 (larger), icon 520-3, and icon 520-4. As mentioned, the icon 520-2 is selected. The icon 520-4 displayed to the right of the icon 520-3 corresponds to the web application 110-4 which is next in sequential order after the web application 110-3. The icon 520-N displayed to the left of icon 520-1 corresponds to the web application 110-N which is the last web application in the set of web applications 110-1 through 110-N encapsulated by the application management framework 100.

Using this scheme, the icon for the current web application such as icon 520-X, where $1 \leq X \leq N$, is shown in the middle. If the set of displayed icons included on five icons, the previous two icons such as icon 520-(X−1) and icon 520-(X−2) are shown to the left of the icon for the current web application. The next two icons such as icon 520-(X+1) and icon 520-(X+2) are shown to the right of the icon for the current web application. For example, if the icon 520-6 corresponding to web application 110-6 were to be selected; the set of displayed icons would be ordered as icons 520-4, 520-5, 520-6, 520-7, and 520-8.

FIGS. 7A-7F illustrate embodiments of web application and application management framework user interfaces. In FIGS. 7A-7F, the application management framework UI 515 includes icons 520-1 through 520-6 implemented as clock icon 520-1, web mail icon 520-2, weather icon 520-3, search icon 520-4, news reader icon 520-5, and stock listing icon 520-6 that may correspond respectively to active web applications or widgets implemented as clock application 110-1, web mail application 110-2, weather application 110-3, search application 110-4, news application 110-5, and stock listing application 110-6.

FIG. 7A illustrates an embodiment of a web application UI 510-1 (for the web application 110-1) that may be displayed when the icon 520-1 is selected. FIG. 7B illustrates an embodiment of a web application UI 510-2 (for the web application 110-2) that may be displayed when the icon 520-2 is selected. FIG. 7C illustrates an embodiment of a web application UI 510-3 (for the web application 110-3) that may be displayed when the icon 520-3 is selected. FIG. 7D illustrates an embodiment of a web application UI 510-4 (for the web application 110-4) that may be displayed when the icon 520-4 is selected. FIG. 7E illustrates an embodiment of a web application UI 510-5 (for the web application 110-5) that may be displayed when the icon 520-5 is selected. And, FIG. 7F illustrates an embodiment of a web application UI 510-6 (for the web application 110-6) that may be displayed when the icon 520-6 is selected.

By clicking on or otherwise selecting a particular icon from the application management framework UI 515 menu bar, the user may rapidly switch between and among the web applications 110-1 through 110-6 and the displayed web application UIs 510-1 through 510-6. For example, in response to a single touch or key press, the user zooms through the displayed web application UIs 510-1 through 510-6 in rapid succession.

It can be appreciated that the web application UIs 510-1 through 510-6 are exemplary views. For example, any number of web applications 110-1 through 110-N may be contained in the application management framework 100, and any order may be used for the arrangement of the web applications 110-1 through 110-N and their corresponding icons.

In various implementations, the application flip style menu bar of the application management framework UI 515 may help the user navigate advertisements. As shown in FIG. 7E, an exemplary embodiment of the web application UI 510-5 comprises a banner ad 700. As shown in FIG. 7F, an exemplary embodiment of the web application UI 510-5 itself comprises a sponsored advertisement 702.

Figure 8:
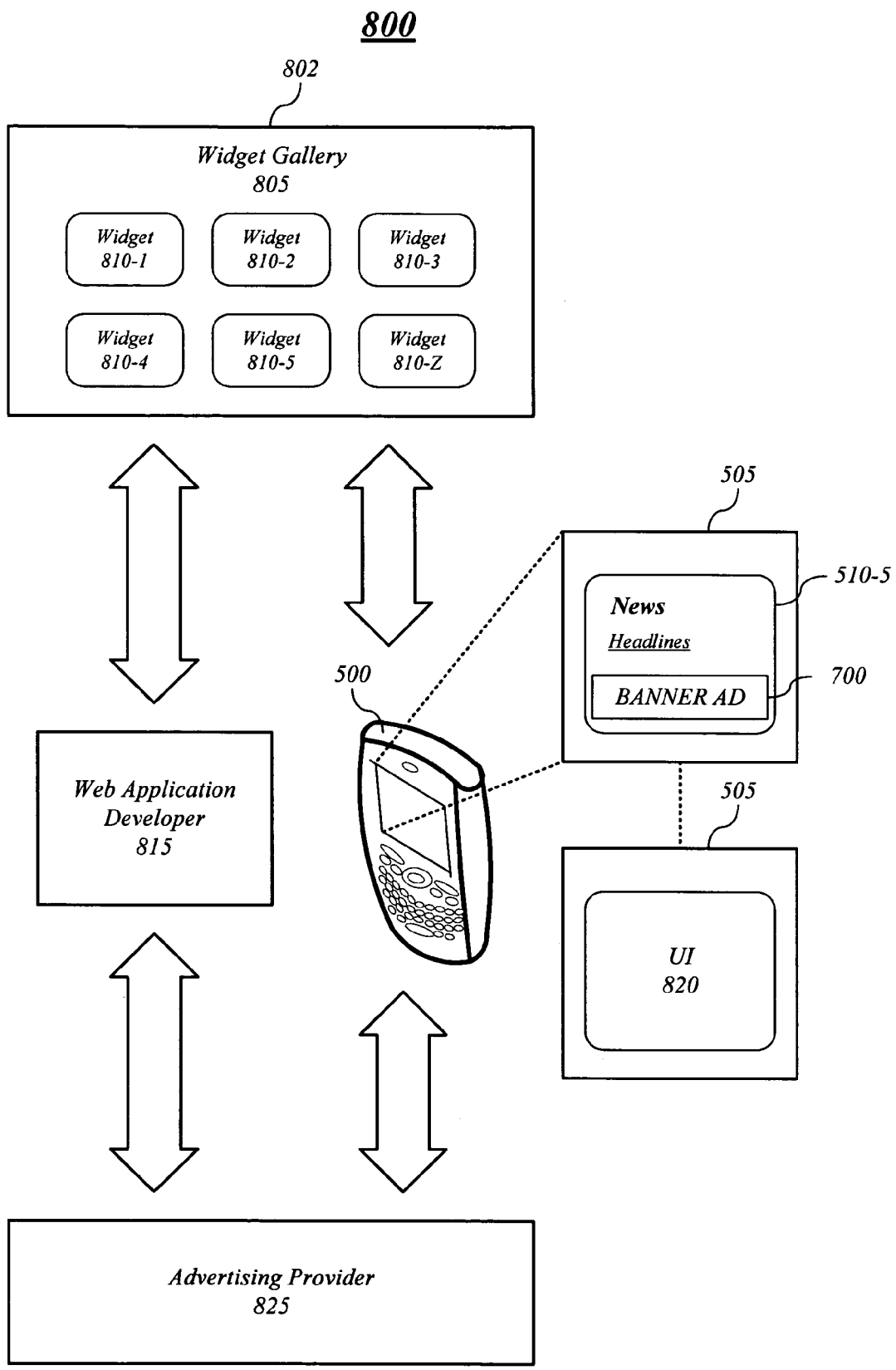
FIG. 8 illustrates an embodiment of communication system.

FIG. 8 illustrates an embodiment of a communications system 800 suitable for practicing various embodiments. Although FIG. 8 depicts a limited number of elements for purposes of illustration, it can be appreciated that the communications system 100 may include more or less elements as well as other types of elements in accordance with the described embodiments. Elements of the communications system 800 may comprise physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

As shown, the communications system 800 may comprise portal provider 802 implementing a widget gallery 805 for storing widgets 810-1 through 810-Z, where Z is any positive integer value in accordance with the described embodiments. In various implementations a web application developer 815 may upload one or more widgets to the widget gallery 805. The web application developer 815 may be associated with the creator or publisher of a web application. Subsequently, a user may download one or more widgets from the portal provider 802 to the mobile computing device 500.

In some implementations, a user may download various web applications or widgets to the mobile device 500 based on a subscription model so that the user can obtain on-device resident web applications and widgets. In one or more embodiments, the widgets may be transparently upgraded by the portal provider 820 and/or the web application developer 815 hosting the widgets. In some cases, certain web applications or widgets may only be displayed or persist for a short period of time, such as during special events (e.g., entertainment events or sporting events like the Olympics).

In various embodiments, widgets need not be resident on the mobile device 500 and can be served live from a server at the portal provider 802. For example, a user can log into the portal provider 802 and be remembered such as automatically via a web browser cookie or manually via a login and password. The widgets of the user can be streamed, live from the portal provider to the mobile device 500 or a desktop browser.

In various implementations, widgets can be configured on the portal provider 802 and the configuration information may move with the widgets to the mobile device 500. When a user purchases a new device, the previously confirmed widgets of the user can be provisioned to the new device. If the device is stolen or lost, the user's widgets can be remotely removed from or shut down on the old device. In one or more embodiments, the user can use their widgets simultaneously on several different devices or desktop computers. Each device may not show the same widgets. That is, the user can configure different devices to show different widgets. The configuration can be device dependent or can be timed-based, preference-based, and/or based on other factors.

If the widget stores application data or configuration data locally, that data can be backed up to the portal provider 802. For example a user can configure a stock tracker widget to track five particular stocks. This widget then gets provisioned to the mobile device 500. On the mobile device 500, the user changes two of the stock symbols via the widget screen controls. These new stocks are quietly sent back to the portal provider 802 as part of the user's configuration for that widget. This allows other devices provisioned for the user to be, optionally, automatically up-to-date. The backup data may occur automatically and without user intervention. In some cases, the backup data is optional depending on the type of widget application.

In accordance with various embodiments, the web application developer 815 may have several options for generating advertising revenue. For example, one advertising option includes the portal provider 802 adding a banner ad to a widget. In some cases, the portal provider 802 may add the banner ad to the widget during run-time. In other cases, the web application developer 815 may include the banner ad in the widget. An example implementing this option is the web application UI 510-5 that includes a banner ad 700. Revenue generated when the banner ad 700 is clicked may be shared with the web application developer 815.

Another advertising option is an ad-free implementation where the widgets are sponsored. In this case, the web application developer 815 may pay the portal provider 802 to disable ads. The web application developer 815 then owns the whole screen of the widget and the user experience. The widget may be effectively implemented as one large interactive branded ad. The widgets provide value to users while letting marketers get their message out. In some cases, the widget may comprise a direct click-through to the brand's website. An example implementing this option is the web application UI 510-6 that itself comprises a sponsored widget.

Various revenue sharing models may be implemented in accordance with the described embodiments. For example, widget interactions may use cost per thousand (CPM), cost per click (CPC), cost per (CP) application use models, and others. Such CPM, CPC, and CP application use models may be based on screen area reserved for ad interactions. When the web application developer 815 generates advertisement displays within their application on the mobile device 500, the web application developer 815 may receive a royalty. For example, the web application developer 815 can receive a royalty for each installation of their application on a device, for use/user interactions of their application on a device, for advertising revenue generated through their application on the device, and/or for the revenue generated by the action occurring subsequent to an ad or widget click-through (e.g., subsequent purchase of goods or services following a click-through to a merchant website).

In the embodiment shown in FIG. 8, the user of the mobile device 500 is presented with a widget such as web application UI 510-5. The web application UI 510-5 may correspond, for example, to a web application containing an ad area in a portion of its screen area. The ad area may be filled with an impression-based ad such as banner ad 700, which may be monetized on a CPM basis. The banner ad 700 may be actionable (e.g., hyperlinked) which can be clicked on or selected via keypad or touch enabled controls of the mobile device 500.

In this exemplary embodiment, when the user interacts with (e.g., clicks) the banner ad 700, another UI 820 is presented within the web browser UI 505. The UI 820 may be a merchant website associated with the banner ad 700, for example, or other normal website on the Internet. A widget may connect to a website affiliated with the web application developer 815, a merchant website, or another website or server to provide additional services. In some cases, the UI 820 may be a previously hidden screen, stored within the widget that permits either a more detailed view of the ad information or an interactive screen where the user can interact with the ad.

The widget may interact with the web application on a server, in online, or in offline modes. In various implementations, for example, advertising content may be cached (e.g., one or more links deep) so that the content of a clicked ad can be accessed when offline. User/ad interaction may be submitted to the server of the advertising provider 825 immediately (e.g., online mode) or deferred (e.g., offline mode). An authentication sequence may be implemented to ensure legitimacy of ads that are viewed/clicked offline and deferred for later reporting. For example, when a user clicks an ad when the widget is offline, the click is logged with a timestamp. An identifier, timestamp, and device certificate are combined in a hash and stored. The hash can later be compared against the device certificate to ensure a match to the timestamp/device. When online, the package is sent to the server of the advertising provider 825 for ad revenue payment processing.

In some embodiments, a particular web advertisement may be selected for display in a web application running on the mobile device 500 based on caller identification (caller id) information. Caller identification (caller ID) information may be obtained from an incoming call to the mobile device 500 or from an outgoing call from the mobile device 500. An ad request may be generated by the mobile device 500 based on the caller ID information and sent to a web advertising server of the advertising provider 825. The ad request may be sent to the web advertising server immediately or deferred until at a later time. The ad request may be used for querying the web advertising server with the caller id information.

In response to the ad request, the web advertising server may select a relevant ad based on the caller ID information and may send the relevant web advertisement to the mobile device 500. The mobile device 500 may receive the web advertisement relevant to the caller id information from the web advertising server and store the web advertisement in a local database (e.g., SQL database 213) on the mobile device 500.

On the mobile device 500, the web advertisement may be inserted into a web application. The web advertisement may be displayed in the telephone user interface software or in a separate software application. The web advertisement may be displayed immediately in a user interface on the mobile device 500 such as in a telephone user interface during a call. The web advertisement also may be stored and displayed at a later time.

When the user views and/or clicks on the web advertisement, the mobile device 500 logs the interaction (e.g., view and/or click) of the user with the web advertisement. User/ad interaction may be submitted to web advertising server immediately (online mode) or deferred (offline mode). In some implementations, the user may receive credit for interacting with web advertisements. For example, a business method may be implemented in which revenue from the advertiser may be used to partially or wholly subsidize the user's ownership or service plan for the mobile device. In some cases, credit may be received from an advertising provider based on a variety of criteria, such as number of user clicks on an advertisement, number of "page views" of an advertisement, etc. In some cases, credit may be received from parties other than the advertising provider (e.g., a merchant, web application developer, etc.)

In various implementations, the described embodiments enable advertisers to acquire valuable information about relationships between buyers and sellers. In addition, such information may be collected in an efficient and inexpensive manner. This allows advertisers to quickly gain insight into specific types of buyer-seller relationships and generate precision-targeted advertisements based on the specifics of an individual user. For example, an advertiser may target a user based on the identification of a probable existing relationship between a customer and a seller or service provider. The advertiser also may make a special offer available to an existing customer or may make a special offer from a competitor to a potential customer.

The caller ID information of an incoming call or of an outgoing call may provide a useful context to query for additional related information. For example, the user may benefit from knowing if there are recent news articles about a vendor that he or she is calling. In these cases, the user of the mobile device benefits from the additional context-sensitive information, and an advertiser benefits from reaching a potential customer who has a significant likelihood of being interested in targeted offers from an advertiser.

In some implementations, when a friend calls, the user may benefit by being reminded of the caller's birthday, anniversary, etc. This information may generate a query to an advertising server which may then result in an offer to the user being displayed in a web application user interface on the mobile device. The offer in the web application may link directly the advertiser's web site (e.g., hyperlink), include a hyperlink for a map, a hyperlink to make an online reservation, and a telephone link to dial the telephone phone number directly from the mobile device 500. All of this functionality may be available without requiring the user quit the telephone application and start a separate web browser or other software application, thereby vastly speeding user interaction.

It can be appreciated that many advertising variations are possible. For example, the web application may provide additional services where billing may be accomplished via a stored or manually entered credit card, billing may be accomplished by direct billing to the user's mobile billing/carrier account, optional services may be tied to the phone number received or called (e.g. it's Sam's birthday—would you like to send a gift?), the user may buy something from a web store/catalog while on the call or at some later time, and so forth.

In some implementations, the telephone number of the other call participant may be queried in a database to determine if the number is on a "watch list" for security purposes or based on the wishes of the phone user. An appropriate message may then be generated and displayed in the web application, when, for example, a caller is known to be from a fundraising organization. The telephone number of the other call participant may be queried against an advertising database to identify offers for competitors' products. The telephone number of the other call participant may be used to initiate other forms of communication during a call or at some later time. For example, a portion of the web application screen may become an instant messaging session with the other call participant so that text, pictures or files may be exchanged directly between the participants.

It also can be appreciated that hat a call may include more than two participants. For example, a web application UI may be divided to show all or some of the call participants' information and may permit transfer of text, pictures or files among the participants. Additionally, all of the participants may see the same display in their respective web application user interfaces, or they may see different displays with potentially different web advertisements inserted.

Additional advantages may be provided by obtaining information from caller ID tags or subsequent queries. The information obtained from the caller id tags or subsequent queries need not be used immediately. Instead, this information may be stored or cached for later use at an appropriate time, even when the mobile device phone is not immediately connected to a network or out of cellular coverage, such as in an airplane or in a tunnel.

A further advantage is that the information obtained from the caller id tags or subsequent queries may be used directly in a web application on the mobile device. This is advantageous to the user because the interaction model with a web application (e.g., inputs using a stylus, keypad, mouse, etc., clicking hyperlinks, scrolling pages, and so forth) is familiar to the user. Additionally, web publishers are familiar with web application programming and thus need no special programming skills specific to the mobile device of the user. Moreover, the web application provides a simple mechanism to link further information or web resources directly to the caller id information without having to switch applications or wait for a special software application to start up ("boot").

It can be appreciated that portal provider 802, the web application developer 815, and the advertising provider 825 may comprise or utilize any suitable computing devices having computing capabilities and/or communications capabilities in accordance with the described embodiments. Exemplary computing devices may include, without limitation, a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof.

Figure 9:
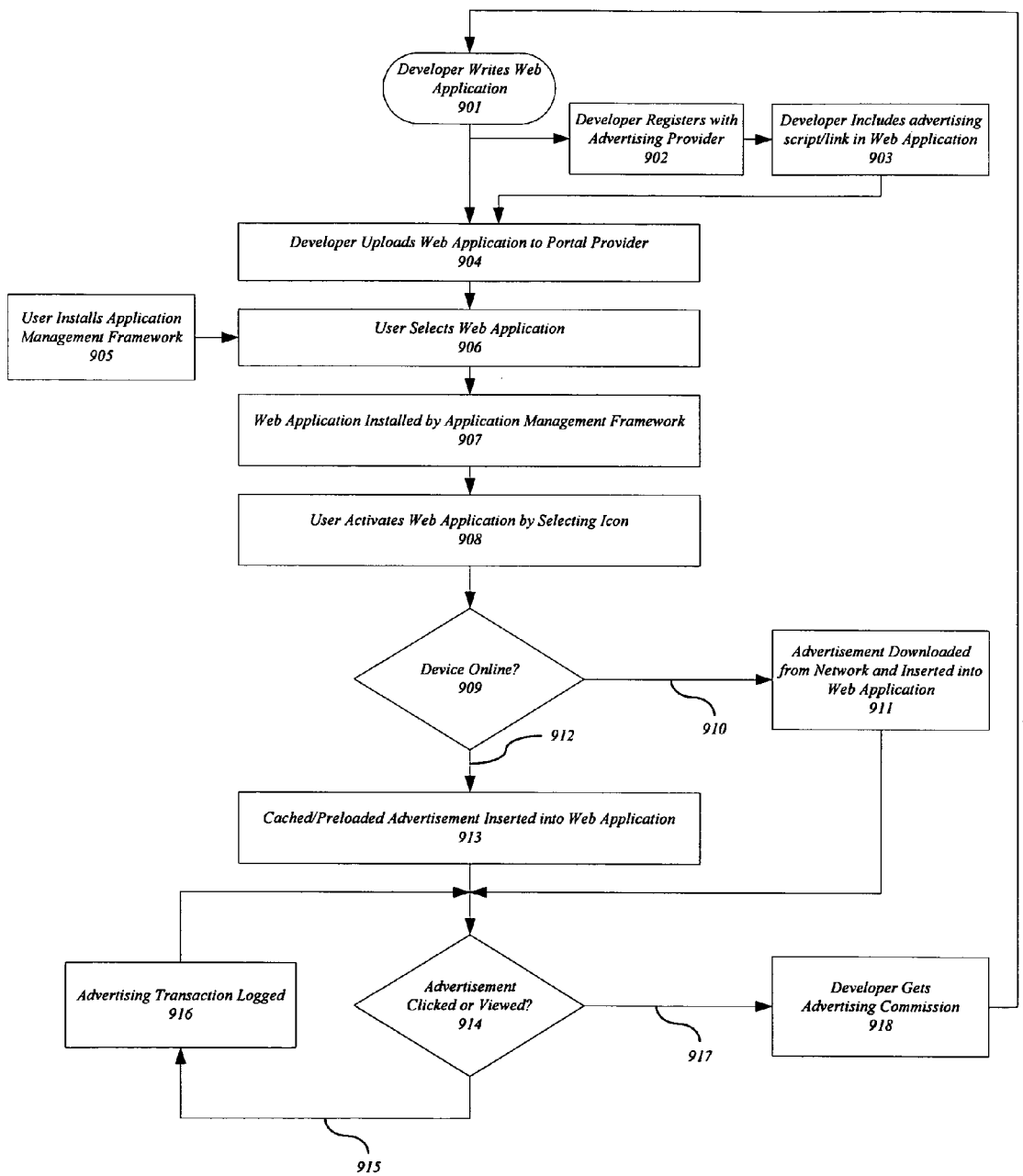
FIG. 9 illustrates an embodiment of a logic flow for generating advertising revenue.

FIG. 9 illustrates a logic flow 900 for generating advertising revenue, which may be representative of the operations executed by one or more embodiments described herein. The logic flow 900 may be performed by various systems and/or devices and may be implemented as hardware, software, firmware, and/or any combination thereof, as desired for a given set of design parameters or performance constraints. For example, one or more operations of the logic flow 900 may be implemented by executable programming instructions to be executed by a logic device (e.g., computer, processor).

In this embodiment, the logic flow 900 demonstrates the interaction among a mobile device 500, a portal provider 802, a web application developer 815, and an advertising provider 825 for generating advertising revenue. In various implementations, the mobile device 500 of a user may comprise an application management framework 100 and, optionally, the WebVM 210.

The logic flow 900 begins when the web application developer 815 writes a web application (step 901). The web application developer 815 registers with the advertising provider (step 902) and provides any necessary information and credentials required by the advertising provider 825 so that the web application developer 815 may obtain advertisements from the advertising provider 825. In one embodiment, appropriate security credentials are used between the web application developer 815 and the advertising provider 825 to ensure the security and integrity of the transactions between the web application developer 815 and the advertising provider 825. The web application developer 815 then includes a web link or script within the web application (step 903) so that the web application may obtain advertisements from the server of the advertising provider 825 when requested.

The web application developer 815 then uploads the web application to the portal provider 802 (step 904). In various implementations, appropriate security credentials are used between the developer 815 and the portal provider 802 to ensure the security and integrity of the transactions between the developer and the portal provider. The portal provider 802 stores the web application and/or the information necessary for the web application to be obtained from a server.

A user wishing to make use of available web applications installs an application management framework 100 and optionally the WebVM 210 from the portal provider 802 on the mobile device 500 (step 905). In one embodiment, the user registers with the portal provider 802 with appropriate security credentials to ensure the security and integrity of the transactions between the portal provider 802 and the user. The user may browse available web applications via the web portal and select a web application action (step 906). The web application is downloaded and installed by the application management framework 100 on the mobile device 500 (step 907). The user activates the web applications by selecting the corresponding web application icon (step 908).

In an exemplary embodiment of the logic flow 900, different steps may be taken when a user accesses a web application depending on whether the mobile device 500 is immediately connected to a network "online" (step 909). If the mobile device 500 is connected to a network (that 910), the web application in conjunction with the application management framework 100 and/or the WebVM 210 may request and obtain an advertisement from the web application developer's advertising provider 825 via the network. The advertisement may then be downloaded and inserted into the users selected web application (step 911).

If, however, the mobile device 500 is not immediately online (step 912), the web application in conjunction with the application management framework 100 and/or the WebVM 210 may load from local storage on the mobile device 500 a cached or preloaded advertisement which may then be inserted into the selected web application (step 913). These cached or preloaded advertisements may be obtained from time to time by the WebVM 210 from advertising provider 825, regardless of whether a given web application is running or not.

Whenever a user views or clicks on an advertisement, different steps may be taken depending on whether the mobile device 500 is online or not (step 914). If the mobile device 500 is not online (step 915), the transaction is logged for later transmission (step 916). From time to time, when the mobile device 500 is online, the WebVM 210 may then transmit the relevant transaction information to the advertising provider 825 so that the web application developer 815 may receive an advertising commission. This may occur regardless of whether the web allocation that contains the advertisement is running or not.

If the mobile device 500 is online when the user clicks on an advertisement (step 917), the web application in conjunction with the application management framework 100 and/or the WebVM 210 may transmit the relevant transaction information to the advertising provider so that the web application developer may receive an advertising commission (step 918). In an alternate embodiment, the WebVM 210 may instead defer the transmission of the advertising transaction details until a later time (e.g., to batch transmit many transactions at once).

In some embodiments, authentication or auditing steps may occur among the mobile device 500, portal provider 802, web application developer 815, and advertising provider 825 to ensure that the advertising transactions are legitimate and that "click fraud" does not occur.

The described embodiments provide the user with an incentive to download and use web applications for the activities and services provided. The web application developer 815 has a financial incentive to create web applications to share in advertising revenue and a mechanism to distribute authored web applications via the portal provider 802. The web application developer 815 also has a mechanism to obtain advertisements from the advertising provider 825. Furthermore, the web application developer 815 may earn advertising revenue for transactions by the user even when the mobile device 500 is not online. The advertising provider 825 may earn a profit from its advertisers and has a mechanism to distribute its advertisements via web applications. The portal provider 802 has an incentive to distribute web applications to users by sharing in advertising revenue.

Furthermore, the portal provider 802 may earn advertising revenue for transactions by the user even when the mobile device 500 is not online. It can be appreciated that, in some embodiments, some or all of the roles of the user, the portal provider, the web application developer, and the advertising provider may be played by common entities. As described above, the embodiments create a self-sustaining "virtuous cycle" where all participants benefit.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. It also can be appreciated that while a logic flow may illustrate a certain sequence of steps, other sequences of steps may also be performed according to alternative embodiments. Moreover, some individual steps of a logic flow may include multiple sub-steps that may be performed in various sequences as appropriate to the individual step. Furthermore, additional steps may be added or some steps may be removed depending on the particular implementation.

In addition, the logic flow may be implemented by a hardware element, a software element executed by a computer, a firmware element embedded in hardware, or any combination thereof. In various embodiments, the logic flow may comprise, or be implemented as, executable computer program instructions. The executable computer program instructions may be implemented by software, firmware, a module, an application, a program, a widget, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable high-level, low-level, object-oriented, visual, compiled and/or interpreted programming language in accordance with the described embodiments.

In various embodiments, a logic flow may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments. In such embodiments, a computer may include any suitable computer platform, device, system, or the like implemented using any suitable combination of hardware and/or software.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile device comprising:
   a processor;
   a display;
   a web browser displayed on the display;
   an application management framework, under control of the processor, implemented within the browser, the application management framework encapsulating multiple web applications; and
   an application management framework user interface, displayed on the display, comprising a menu bar further comprising a set of icons corresponding to a plurality of active web applications running within the application management framework, wherein one icon from the set of icons is a selected icon corresponding to a currently selected application, the selected icon centered on the menu bar, the menu bar implemented as an application flip tray such that a user can flip through the set of icons in response to one or more user events and the menu bar configured to auto-hide to reserve available screen area for the currently selected application displayed on the display of the mobile device.

2. The mobile device of claim 1, the application management framework user interface to allow switching between the web applications of the application management framework in a single browser instance.

3. The mobile device of claim 1, the application management framework user interface to provide a common set of input controls for the web applications of the application management framework.

4. The mobile device of claim 1, the user events comprising one of a touchscreen input, button input, mouse click, stylus click, keyboard input, jog wheel input, and voice input.

5. The mobile device of claim 1, one or more of the web applications of the application management framework comprising a widget.

6. The mobile device of claim 1, wherein one or more of the web applications are active when the mobile device is not connected to an active network.

7. The mobile device of claim 1, one or more of the web applications of the application management framework comprising an advertisement.

8. The mobile device of claim 7, the advertisement comprising an actionable banner ad.

9. The mobile device of claim 7, the advertisement comprising the entire web application.

10. The mobile device of claim 1, further comprising a web virtual machine communicatively linked to the application management framework, the web virtual machine comprising a local web server host on the mobile device.

11. A method comprising:
   installing an application management framework within a web browser;
   installing multiple web applications within the application management framework; and
   displaying an application management framework user interface comprising a menu bar further comprising a set of icons corresponding to a plurality of active web applications running within the application management framework, wherein one icon from the set of icons is a selected icon corresponding to a currently selected application, the selected icon centered on the menu bar, the menu bar implemented as an application flip tray such that a user can flip through the set of icons in response to one or more user events and the menu bar configured to auto-hide to reserve available screen area for the currently selected application displayed in the web browser of a mobile device.

12. The method of claim 11, further comprising provisioning one or more of the web applications for use on one more computing devices.

13. The method of claim 11, further comprising installing a web virtual machine to communicate with the application management framework, the web virtual machine comprising a local web server host on the mobile device.

14. The method of claim 13, the web virtual machine comprising a web services manager in communication with the application management framework over a direct message passing interface.

15. An article of manufacture comprising a non-transitory computer-readable storage medium comprising executable computer program instructions that when executed cause a computing system to perform the method of claim 11.

* * * * *

UNITED STATES PATENT AND TRADEMARK OFFICE
CERTIFICATE OF CORRECTION

PATENT NO. : 8,458,612 B2
APPLICATION NO. : 12/181776
DATED : June 4, 2013
INVENTOR(S) : Manjirnath Chatterjee et al.

Page 1 of 1

It is certified that error appears in the above-identified patent and that said Letters Patent is hereby corrected as shown below:

In the Claims

In column 32, line 10, in Claim 12, delete "one more" and insert -- one or more --, therefor.

Signed and Sealed this
Twenty-fourth Day of September, 2013

Teresa Stanek Rea
*Deputy Director of the United States Patent and Trademark Office*